United States Patent [19]
McCormack et al.

[11] Patent Number: 6,112,267
[45] Date of Patent: Aug. 29, 2000

[54] HIERARCHICAL RING BUFFERS FOR BUFFERING DATA BETWEEN PROCESSOR AND I/O DEVICE PERMITTING DATA WRITES BY PROCESSOR AND DATA READS BY I/O DEVICE SIMULTANEOUSLY DIRECTED AT DIFFERENT BUFFERS AT DIFFERENT LEVELS

[75] Inventors: Joel James McCormack, Boulder, Colo.; Christopher Charles Gianos, Sterling, Mass.; James Timothy Claffey, Groton, Mass.; Danny Paul Eggleston, Rochdale, Mass.; Tracey L. Gustafson, Hudson, Mass.

[73] Assignee: Digital Equipment Corporation, Maynard, Mass.

[21] Appl. No.: 09/086,134

[22] Filed: May 28, 1998

[51] Int. Cl.[7] ............... G06F 13/14; G06F 13/16
[52] U.S. Cl. ............... 710/52; 710/53; 710/56; 711/117; 711/119; 711/122
[58] Field of Search ............... 710/1, 52, 53, 710/56; 711/117, 122, 119

[56] References Cited

U.S. PATENT DOCUMENTS

| | | | |
|---|---|---|---|
| 4,510,581 | 4/1985 | Cohen | 364/900 |
| 5,671,444 | 9/1997 | Akkary et al. | 395/872 |
| 5,768,626 | 6/1998 | Munson et al. | 395/877 |
| 5,799,209 | 8/1998 | Chatter | 395/876 |
| 5,829,038 | 10/1998 | Merrell et al. | 711/143 |
| 5,948,082 | 9/1999 | Ichikawa | 710/52 |
| 5,983,293 | 11/1999 | Murakami | 710/56 |

*Primary Examiner*—Thomas C. Lee
*Assistant Examiner*—Rehana Perveen
*Attorney, Agent, or Firm*—Pennie & Edmonds LLP

[57] ABSTRACT

The invention includes an apparatus and method for buffering data transmitted by a processor and received by an I/O device via a memory and buses. The memory arranged at a plurality of levels includes a lower level of the memory operating faster than a higher level of the memory. A plurality of ring buffers are allocated at different levels of the memory and available buffers at a lowest possible level of the memory are preferentially selected as write buffers to store data transmitted by the processor. The apparatus includes a first level of the memory arranged on an integrated circuit with the processor, a second level of the memory arranged in an off-chip cache, and a third level of the memory arranged in a dynamic random access memory. Read buffers are selected to store data to be received by the I/O device. Stored control values indicate the order for selecting the read buffers and are used by the processor to select the write buffer. Control values are stored in sets of registers located in the I/O device and in a software-based set of registers located in the dynamic random access memory. A selection register located in the I/O device indicates the selected read buffer.

27 Claims, 21 Drawing Sheets

HIERARCHICAL RING BUFFERS FOR BUFFERING DATA BETWEEN PROCESSOR AND I/O DEVICE PERMITTING DATA WRITES BY PROCESSOR AND DATA READS BY I/O DEVICE SIMULTANEOUSLY DIRECTED AT DIFFERENT BUFFERS AT DIFFERENT LEVELS

FIELD OF THE INVENTION

This invention relates generally to computer memory management and, more particularly, to optimizing memory utilization in the communication between a processor and an input/output device.

BACKGROUND OF THE INVENTION

A computer system typically includes several essential components: a processor, memory, and input and output ("I/O") devices, e.g., printers, graphics devices, or network interfaces. In most modern systems, computer memory is usually arranged in a hierarchy. The hierarchy extends from memory placed closest to the processor, typically, smallest, fastest, and most expensive, to that furthest from the processor, typically, largest, slowest, and cheapest. Conventional memory components in ascending order of the hierarchy generally include processor cache ("on-chip" cache), static random access memory (static "RAM" or "SRAM") cache ("off-chip" cache), main memory dynamic random access memory (dynamic "RAM" or "DRAM"), and disks. In other words, memory at lower levels of the hierarchy is typically smaller and faster while memory at higher levels of the hierarchy is relatively larger and slower. Memory use must be optimized to achieve a balance between system cost and system performance.

Communication pathways between the computer system's components comprise bus lines that carry timing, address, data, and control signals. The flow of data on these pathways between a processor and an I/O device presents two fundamental problems in computer system design. Processors often produce data at a quicker rate than can be accepted by a device while, conversely, devices often spend idle time awaiting a processor occupied with computations. Without attempts to mitigate these situations, computer system performance suffers. Solutions to these problems have been implemented through the use of memory buffers. A buffer is a specifically allocated portion of memory.

A memory buffer can provide a temporary data repository to mediate the flow of data between a processor and an I/O device. When the I/O device temporarily processes data more slowly than the processor transmits data, the buffer permits the processor to continue producing data. When the I/O device temporarily can read data more quickly than the processor transmits data, the buffer may permit the I/O device to continue consuming previously produced data.

One I/O device, of particular susceptibility to highly variable data rates, is a graphics device. In general, during operation of a graphics device, large amounts of graphics data are converted by the graphics device to pixel data according to complex commands and data provided by the processor. If the commands are not received in time, the graphics device is idle. Brief periods with very high data generation and transmission intermix with longer periods of relatively low rates of data generation and transmission. These brief periods can generate and transmit data at a rate beyond the processing rate of the graphics device.

With insufficient buffering for this data, the processor will stall when the buffer fills. The processor must then wait for the graphics device to read and process data in the buffer. At other times, the converse problem can occur: the graphics device awaits data or commands from a compute-bound processor, i.e. the processor has stopped generating data and commands while engaged in other lengthy computations. At such times, the graphics device will sit idly awaiting new data and commands from the processor. In this case, a small buffer guarantees that the graphics device will sit idle for nearly the same length of time that the processor is not generating new data for the graphics device. A larger buffer may allow the graphics device to operate for long periods of time—perhaps the entire time—while the processor is not generating new data for the graphics device, when the buffer contains a relatively large amount of previously generated data.

Even a graphics device that reads data very rapidly will occasionally receive time consuming requests, e.g., a command to copy a huge rectangle of pixels from one place in a frame buffer to another. Again, with insufficient buffer space for data following such requests, the processor will soon stall.

As an alternative to idle waiting for the graphics device to read data from the buffer before the processor can write more data, the processor can switch contexts and start executing a different application. While this may cause other applications to execute faster, this provides no increase in performance of the graphics device. Indeed, context switching can decrease graphics performance due to the large overheads involved in a context switch, which can result in the graphics device remaining inefficiently idle while the processor executes another application.

In a real-time application, the most efficient operation of a processor and a graphics device, through avoidance of stalls either by the processor or the graphics device, may require a buffer large enough to store millions of bytes of data. Of the several possible locations in the memory hierarchy for a buffer, one would like the location of the buffer to be at a level that allows the processor to send data to the buffer at a highest possible rate.

Direct Programmed I/O ("PIO") provides one approach for buffer use. Some computer system designs achieve the highest possible processor performance and highest possible data transmission rate through the use of PIO. This approach requires the presence of a large buffer at the graphics device. The graphics device generally possesses a computational graphics IC as one of its component parts. Unfortunately, current technology makes it impractical to include a large buffer, e.g., one with several hundred to thousands of kilobytes, directly within the graphics IC.

Off-chip RAM located in the graphics device can support such a large buffer, but at an undesirable cost. Also, such an RAM is usually single-ported, i.e., the RAM can either receive or transmit data at any given instant in time. The off-chip RAM must have a sufficient data transmission rate to multiplex, i.e., switch, between receiving new data from the processor, and transmitting stored data to the graphics device. Though a single RAM might be capable of storing enough bytes, the RAM may not have enough pin bandwidth, meaning data transmission rate capacity. Thus multiplexing may force the use of two or more RAM chips, further increasing the cost of the graphics device. To accommodate off-chip RAM, the graphics IC must be designed with extra pin connections for reading and writing the RAM buffer; this too increases the cost of the graphics device.

In addition to cost problems, the PIO approach to data transfer also causes a loss of processor performance. In a modern processor, an on-chip write buffer is typically designed to retire modified on-chip cache lines to a high-bandwidth off-chip cache ("level 2 cache"). Therefore, on-chip buffers are fairly small, on the order of 128 to 256 bytes. When confronted with a high-bandwidth stream of writes to a relatively low-bandwidth bus, such an on-chip write buffer can easily fill up, stalling the processor while the graphics device reads the write buffer at a slower rate.

Because of limitations with the PIO approach, graphics devices with large buffering requirements often use a ring buffer stored somewhere in the computer system's memory hierarchy. Such graphics devices use Direct Memory Access (DMA) reads to fetch data and commands from a "DMA ring buffer" at regular intervals. The DMA ring buffer can be located in main memory though such a ring buffer suffers three performance disadvantages: bursts of writes may cause the processor to stall; frequent writes to the DMA ring buffer consume memory bandwidth; and the processor's write buffer will probably not reorder out-of-order writes.

As with the PIO ring buffer, the processor's main memory has fairly low bandwidth compared to the caches. If the processor spends an interval of time computing a large data set and quickly writes the entire set to the DMA ring buffer in a burst of activity, then the processor fills the write buffer faster than main memory can consume the write buffer. Consequently, the processor stalls and performance degrades.

Latency and bandwidth largely influence the performance of many software programs. For such programs, chances in processor clock speed have a minor performance impact, but changes in memory bandwidth and latency have a large performance impact. Where memory band width is insufficient, the increased memory traffic required for a DMA ring buffer can substantially decrease system performance.

These two problems of write buffer stalls and increased memory traffic are further compounded by a third characteristic of many memory subsystems. Marking a page of memory uncached, in order to keep a main memory ring buffer from trashing the caches, may also force writes to the uncached page to occur in order. In many systems, the write buffer allows writes to be reordered to improve memory access patterns. This reordering can help reduce memory traffic to a DMA ring buffer when the processor writes commands non-sequentially. As an example, consider a graphics IC in a graphics device that processes commands of variable length, where a length count is included near the beginning of the command. The processor sequentially writes all of the data for a variable length command, then goes back and non-sequentially writes the length count. Often, these variable-length commands are short enough to fit in the processor's write buffer. This allows the processor's write buffer to reorder the non-sequential length count writes into sequential writes to the memory system. With deactivation of reordering for uncached memory, the non-sequential writes require more transactions with the memory system, more DRAM preeharge and row-activation (page miss) cycles, and take up more space in the write buffer for the same amount of data. This reduces performance.

These problems with buffer management are eliminated in part by making the data buffer small enough to fit into a portion of either the on-chip or off-chip cache. The cache can retire data from the write buffer at a much higher rate than can a buffer in main memory. This reduces instances of a full write buffer and substantially reduces traffic to main memory. The writes can be reordered in the cache and the write buffer. Unfortunately, with the benefits of caching the DMA ring buffer come new problems: cache trashing, I/O bus bandwidth reductions, and validating reads.

Cache trashing occurs when the processor writes to a ring buffer in cache; the writes "pollute" the caches by overwriting useful data with dirty ring buffer data that the processor will never again access. Worse still, the larger the ring buffer, the more cache pollution occurs. This leads to more frequent processor stalls as the processor refetches useful, evicted data back into the caches.

Systems with high latencies between the graphics device's bus and one or more of the caches may prohibit DMA's from using the full bus bandwidth. High latency lowers the effective bandwidth for data transmission from the cache to the graphics device. To get higher bandwidth than the off-chip cache supports, the ring buffer must reside in a processor's on-chip cache, which may be too small, or in main memory, which eliminates the other advantages of using a cache.

Finally, writes to a cache usually incur substantial overhead. While writing to a memory location that is not currently in the cache, most modern processors perform a "validating read" in order to maintain data consistency in the cache. Such a write first reads the data for the cache line from higher levels of the memory hierarchy. A write to the processor's on-chip cache fetches the cache line from the off-chip cache; when absent, the write must fetch the cache line from higher levels of memory. These validating reads are performed even when subsequent writes fill the entire cache line with new data, so that the validating read data may never be used. Validating reads may increase write latencies sufficiently so that the write buffer fills and the processor stalls more frequently.

These cache problems diminish with the size of the DMA ring buffer, and become insignificant when the ring buffer size is a fraction of the on-chip cache size. A very small ring buffer minimizes cache pollution, so the ring buffer tends to stay in the cache and validating reads are avoided. In this case, validating reads will almost always fetch data from the off-chip cache rather than from main memory. When the graphics device receives data from the ring buffer, the probes into the on-chip cache are of a low latency. This permits higher bus bandwidths.

Yet with all these benefits of a small, cache-based DMA ring buffer, there remains a need for a very large ring buffer to prevent the processor from stalling under some circumstances. And again, larger ring buffers suffer from increased latency and reduced bandwidth. These problems are exacerbated by graphics devices that read large batches of data at very high rates, e.g. DMA reads at 100 Mbytes/second or more. Computer system design thus faces a trade-off in choice of buffer size and location to optimize the performance of graphics devices and other I/O devices. Therefore, there is a need for a buffering mechanism between a processor and an I/O device in a multi-level memory hierarchy that can improve data throughput and latencies.

SUMMARY OF THE INVENTION

The invention provides an apparatus and method for enhanced processor to I/O device data communication. The invention makes use of hierarchical memory buffers to dynamically direct the data flow from the processor, through the buffers, to the I/O device. The invention permits data writes by the processor and data reads by the I/O device to be simultaneously directed at different buffers located at different levels in the memory hierarchy. The invention optimizes use of memory of different levels in the memory hierarchy as the need for buffer space dynamically varies during computer system operation. The use of multiple buffers and the dynamic switching between buffers enhances the flow of data from the processor, via the buffers, to the I/O device. The switching method permits use of higher bandwidth cache-based buffers with switches to a main memory buffer when the need for a larger buffer arises. The invention permits the relatively continuous flow of software produced data to be maintained while supporting the very high speed hardware mediated DMA reads of a graphics device or similar device. In the example instance of a graphics device, the invention provides a computer system with greatly improved graphics output performance.

The apparatus and method buffer data transmitted by a processor and received by an I/O device via a memory and buses. The memory is arranged at a plurality of levels, a lower level of the memory operating faster than a higher level of the memory. A plurality of buffers are allocated at different levels of the memory and available buffers at a lowest possible level of the memory are preferentially selected as write buffers to store data transmitted by the processor.

In one embodiment, the apparatus includes a first level of the memory arranged on an integrated circuit with the processor, a second level of the memory arranged in an off-chip cache, and a third level of the memory arranged in a dynamic random access memory. Read buffers are selected to store data to be received by the I/O device. A selection register located in the I/O device indicates the selected read buffer. Stored control values indicate the order for selecting the read buffers, and the values are used by the processor to select the write buffer. Control values are stored in hardware sets of registers located in the I/O device and in a software-based set of registers located in the dynamic random access memory. The plurality of buffers can be configured as ring buffers and the control values can be configured to include a head pointer, a tail pointer, a length, and a base address associated with each of the plurality of buffers.

The processor, by comparing the head pointers and the tail pointers, selects the write buffer. When a current write buffer is full, an available buffer at a next higher level of memory is selected as the write buffer. If the current write buffer has fewer memory addresses with stored data than a predetermined number of memory addresses and if a buffer at a next lower level of memory is empty, the buffer at the next lower level of memory is selected as the write buffer.

BRIEF DESCRIPTION OF THE DRAWINGS

The following detailed description makes apparent other purposes and advantages of the invention, with reference to the drawings in which:

FIGS. 3a–3l are a series of block diagrams depicting the structure and function of three ring buffers according to an alternative embodiment of the invention;

DETAILED DESCRIPTION OF PREFERRED EMBODIMENTS OF THE INVENTION

Structure Overview

Figure 1A:
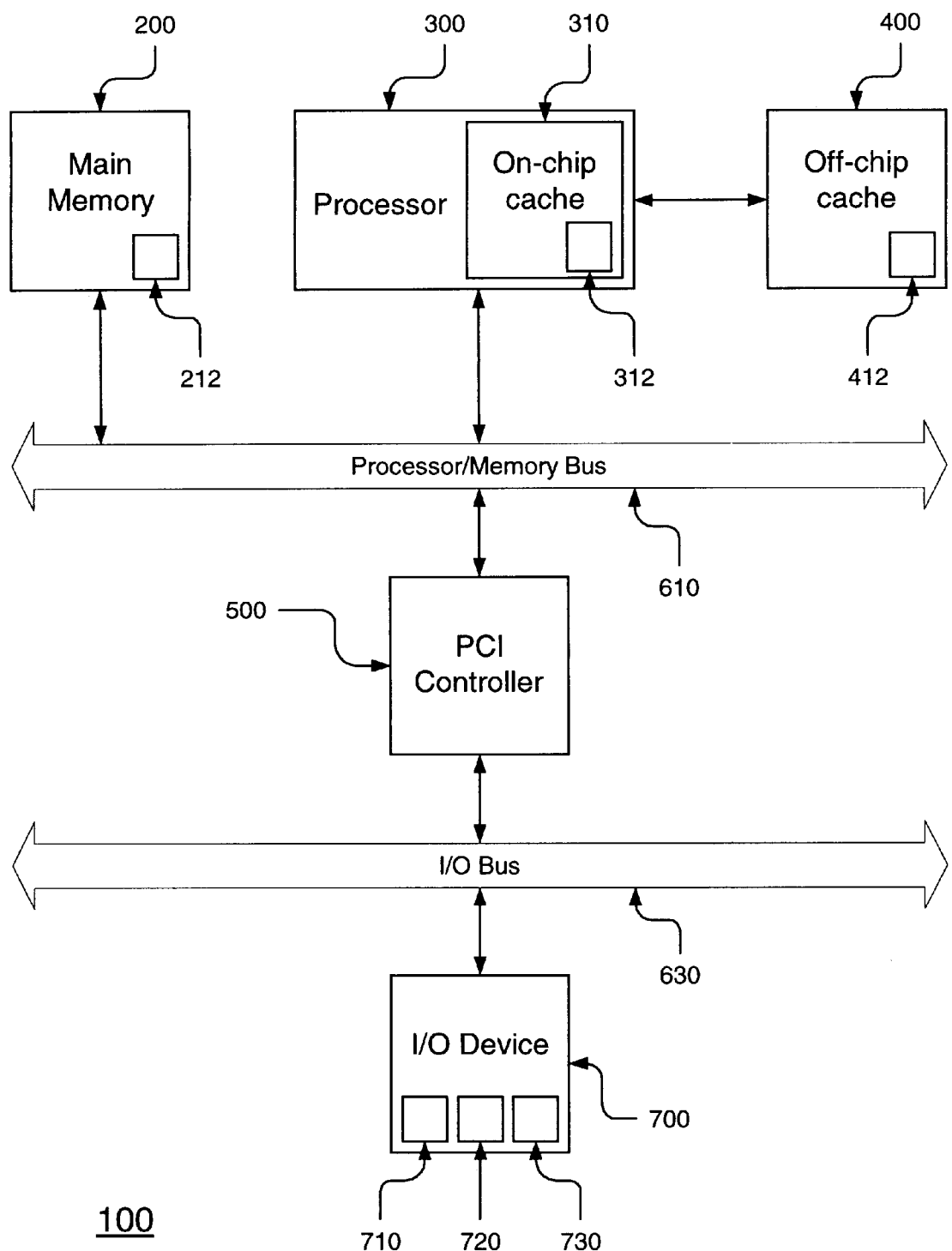
FIG. 1a is a block diagram of a computer system including the apparatus of the invention.

FIG. 1a shows a computer system 100 that uses the invention. The computer system 100 comprises the following hardware components: a processor 300, for example a Digital Equipment Corporation 21164 Alpha processor; a small on-chip processor cache memory 310 ("level 1" or "L1" cache); a first ring buffer 312 small enough to fit in the on-chip cache 310; a larger, off-chip cache 400 ("board" or "L2" cache) in communication with the processor 300; a second ring buffer 412 small enough to fit in off-chip cache 400; main memory 200, typically DRAM; a third ring buffer 212 large enough so that the third ring buffer 212 primarily resides in main memory 200; an I/O device 700, for example a graphics device; a processor-memory bus 610 in communication with the main memory 200 and the processor 300; an I/O bus 630 in communication with the I/O device 700; and a bus controller chip set 500, for example a Peripheral Component Interconnect controller ("PCI" controller), in communication with the processor-memory bus 610 and the I/O bus 630.

Figure 1B:
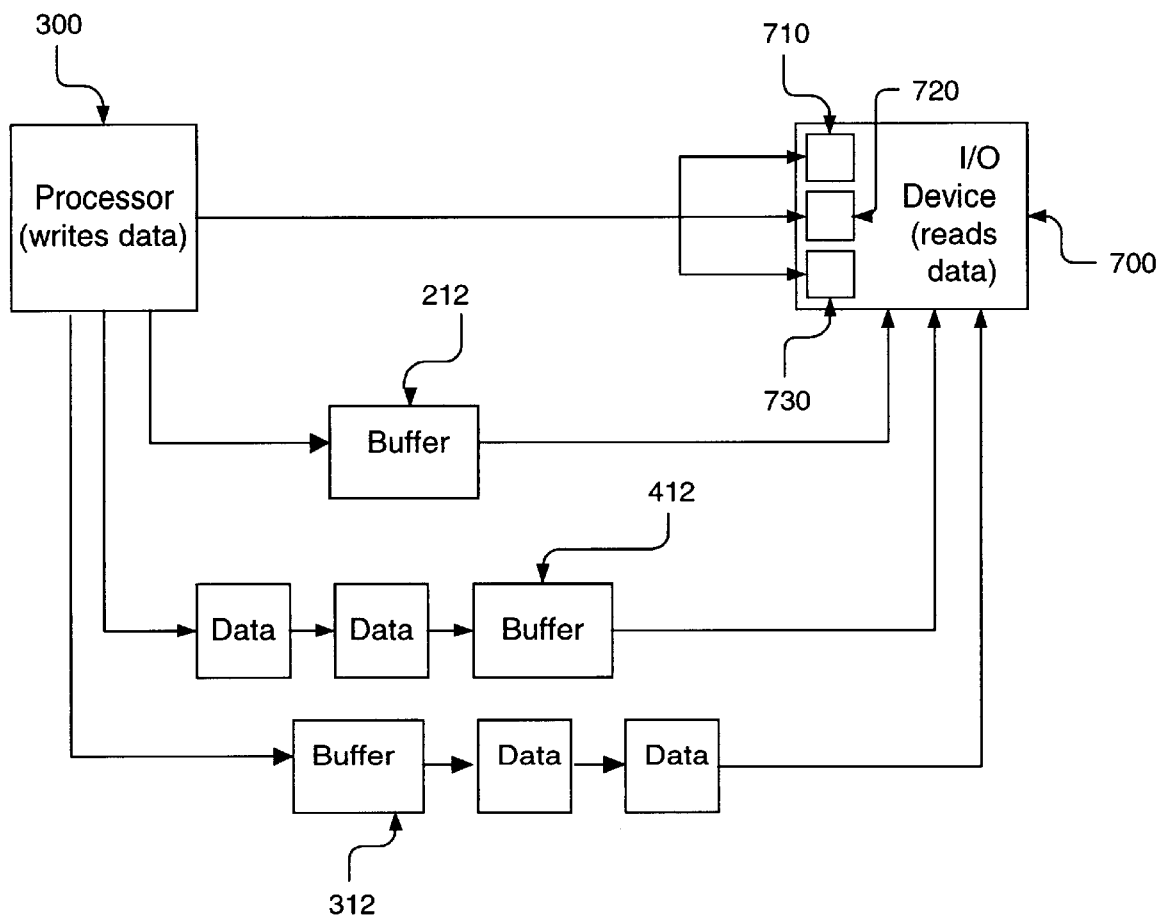
FIG. 1b is a block diagram including primary components of an apparatus according to the invention: a processor; a graphics device; ring buffers located at different levels of the memory hierarchy; sets of registers associated with the buffers; and a selection register for identification of a read buffer.

FIG. 1b schematically depicts communication pathways in the apparatus. The processor 300 communicates data to the ring buffers 312, 412, or 212 while the buffers communicate data to the graphics device 700. Both the processor 300 and the graphics device 700 are in communication with a first and a second hardware set of registers 720 and 730 and a selection register 710, the sets of registers 720 and 730 and the selection register 710 located in the graphics device 700. In addition, there is a software-based set of registers 320 (not depicted in FIG. 1b) located at and in communication with the processor 300.

Figure 2A:
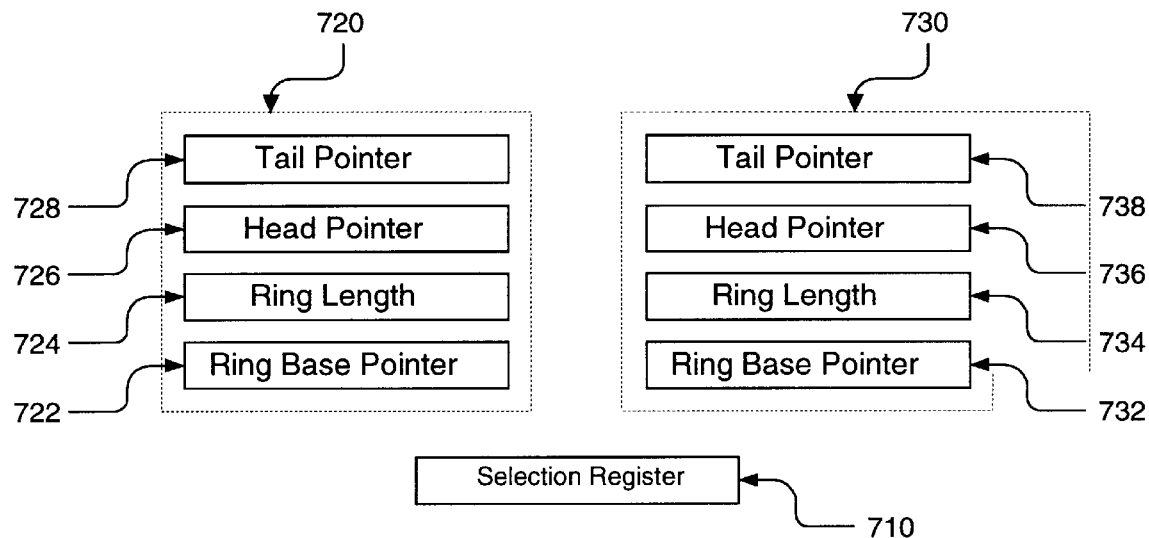
FIG. 2a is a block diagram of the sets of registers in the graphics device associated with the ring buffers.

FIG. 2a depicts the structure of the sets of registers 720 and 730. The sets of registers 720 and 730 are preferably located on the graphics IC of the graphics device 700. The two sets of registers 720 and 730 have identical structure. The description given below for the set of registers 720 applies similarly to the set of registers 730.

The set of registers 720 provides storage for a ring buffer base pointer 722, a ring buffer length 724, a head pointer 726, and a tail pointer 728. The head and tail pointers 726 and 728 may contain ring buffer addresses. Alternatively, the head and tail pointers 726 and 728 may provide the buffer addresses by storing indices to be added to the ring buffer base address.

The base pointer 722 provides the base address of a ring buffer, for example ring buffer 312, while the length 724 provides the size of the ring buffer 312 in bytes, words, or some other convenient format. The tail pointer 728 identifies a buffer address which immediately follows the address of data last written by the processor 300 to, for example, ring buffer 312. The head pointer 726 similarly identifies a buffer address which immediately follows the address of data most recently read from the ring buffer 312 by the graphics device 700.

Figure 2B:
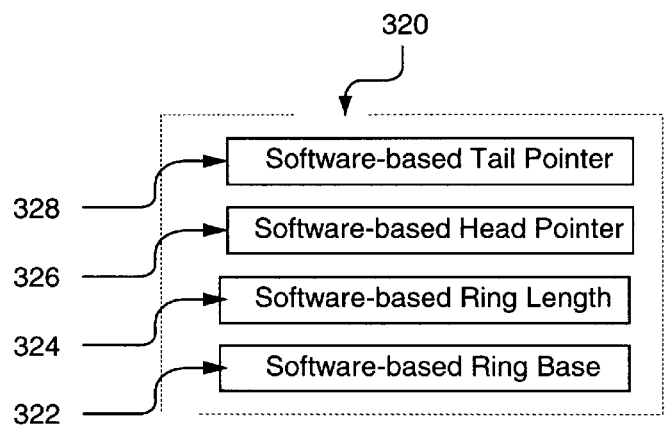
FIG. 2b is a block diagram of the software-based set of registers.

As depicted in FIG. 2b, the software-based set of registers 320 stores the same type of buffer descriptive data as the hardware sets of registers 720 and 730. The set of registers 730 describes the first, second, or third ring buffer, which may be the same as the ring buffer described by the set of registers 720, or a different ring buffer. The software-based set of registers 320 describes yet another ring buffer, for example ring buffer 212, as needed. Details of the functioning of the hardware sets of registers 720 and 730 and the software-based set of registers 320 are described below.

FIG. 2a also depicts the selection register 710 located with the set of registers 720 and 730 of the graphics device. In a preferred embodiment of the invention, the selection register 710 comprises a single bit. The selection register 710 identifies the current or "active" set of registers for graphics device 700 reads, either the set of registers 720 or the set of registers 730, as discussed below. The selection register 710 can be said to hold a "ring active bit". When the ring active bit of the selection register 710 has a logical value of 0, the graphics device 700 uses the set of registers 720 to determine the location of the active ring buffer. When the ring active bit of the selection register 710 has a logical value of 1, the graphics device 700 uses the set of registers 730. In a preferred embodiment, the graphics device 700 always reads data from the presently active buffer, that is, from the buffer described by the active set of registers. It should be noted that inclusion of additional active bits in the selection register 710 would permit the use of additional sets of registers.

Figure 3A:
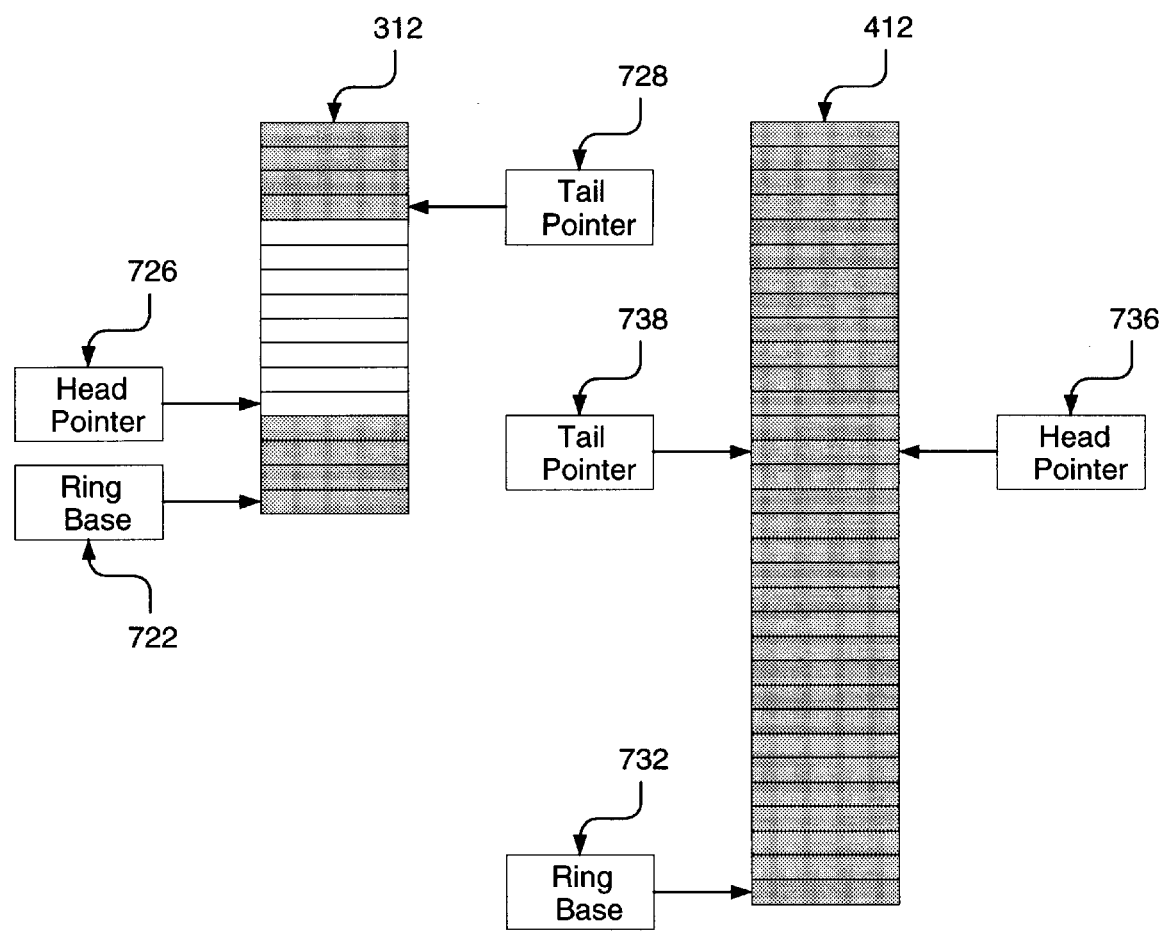

FIGS. 3a through 3l depict the detailed structure and function of the three ring buffers 312, 412, and 212 respectively located in the processor's on-chip cache 310, off-chip cache buffer 400, and main memory 200. The functioning of the three ring buffers 312, 412, and 212 will be illustrated in detail below with reference to FIGS. 3a through 3l. FIG. 3a depicts a small first ring buffer 312, preferably located in the on-chip cache 310, and a relatively large second buffer 412, preferably located in the off-chip cache 400. The drawing is not to scale; in reality buffer 412 is about 16 to 128 times as large as buffer 312. In this example, the set of registers 720 describes buffer 312 and the set of registers 730 describes buffer 412. In FIG. 3a, unshaded ring buffer locations contain data awaiting a read by the graphics device 700: shaded locations are available for data writes by the processor 300.

The processor 300 and the graphics device 700 determine the quantity of data in a ring buffer by comparing the head pointer and the tail pointer in the corresponding set of registers 720 or 730. Consider for example buffer 3 12 and the associated set of registers 720. By detecting when the head pointer 726 and the tail pointer 728 point to the same address, the processor 300 or the graphics device 700 can determine that the buffer 312 is empty. Conversely, a full buffer 312 is detected by determining that the head pointer 726 points to the address that immediately follows the address pointed to by the tail pointer 728.

In a preferred embodiment, the size of the buffers 312, 412, and 212 is fixed during initialization of the apparatus. Given a particular application, these buffer sizes are chosen through experimentation to optimize performance.

Operation Overview

Referring to FIG. 1a, the processor 300 generates data to be eventually read by the graphics device 700. The bus controller 500 allows DMA reads and writes by the graphics device 700 to locations of the memory hierarchy. The controller 500 and the graphics device 700 cooperate to DMA read data from various locations in the memory hierarchy 200, 310, and 400 in accordance with values written by the processor 300 into set of registers 720 and 730. The processor 300 can directly read and write the sets of registers 720 and 730 that reside at the graphics device 700 through PIO transactions. The processor 300 can write data to buffers 312, 412 or 212. These are software writes to memory locations, that is, each item of data written as produced by executing software instructions. The graphics device 700 can read data from buffers 312, 412, or 212. These are DMA reads, that is, large quantities of data are read at a very high rate, e.g. 100 to 400 Mbytes/sec, in large continuous hardware mediated data transfers.

Figure 4:
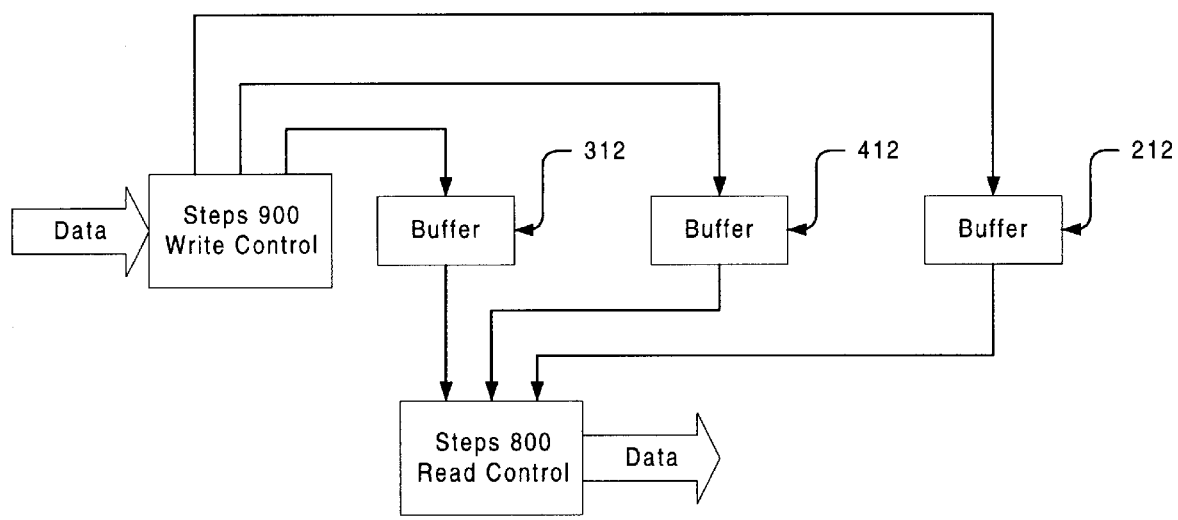
FIG. 4 is a flow diagram of a method of operation of the apparatus.

FIG. 4 illustrates the overall method of operation of the apparatus. Steps 800 of FIG. 5 determine from which buffer 312, 412, or 212 to read data, and then these steps read data from the selected buffer. Steps 900 of FIGS. 6a–d select to which buffer 312, 412, or 212 the data are preferentially written, and then these steps write the data to the selected buffer. The dynamic and independent functioning of steps 900 and steps 800 permits the software writes and DMA reads to make use of buffers at different locations in the memory hierarchy; this mitigates the problems of small on-chip cache buffer 312 size, off-chip cache buffer 412 latency, and main memory buffer 212 bandwidth, as described above.

Figure 5:
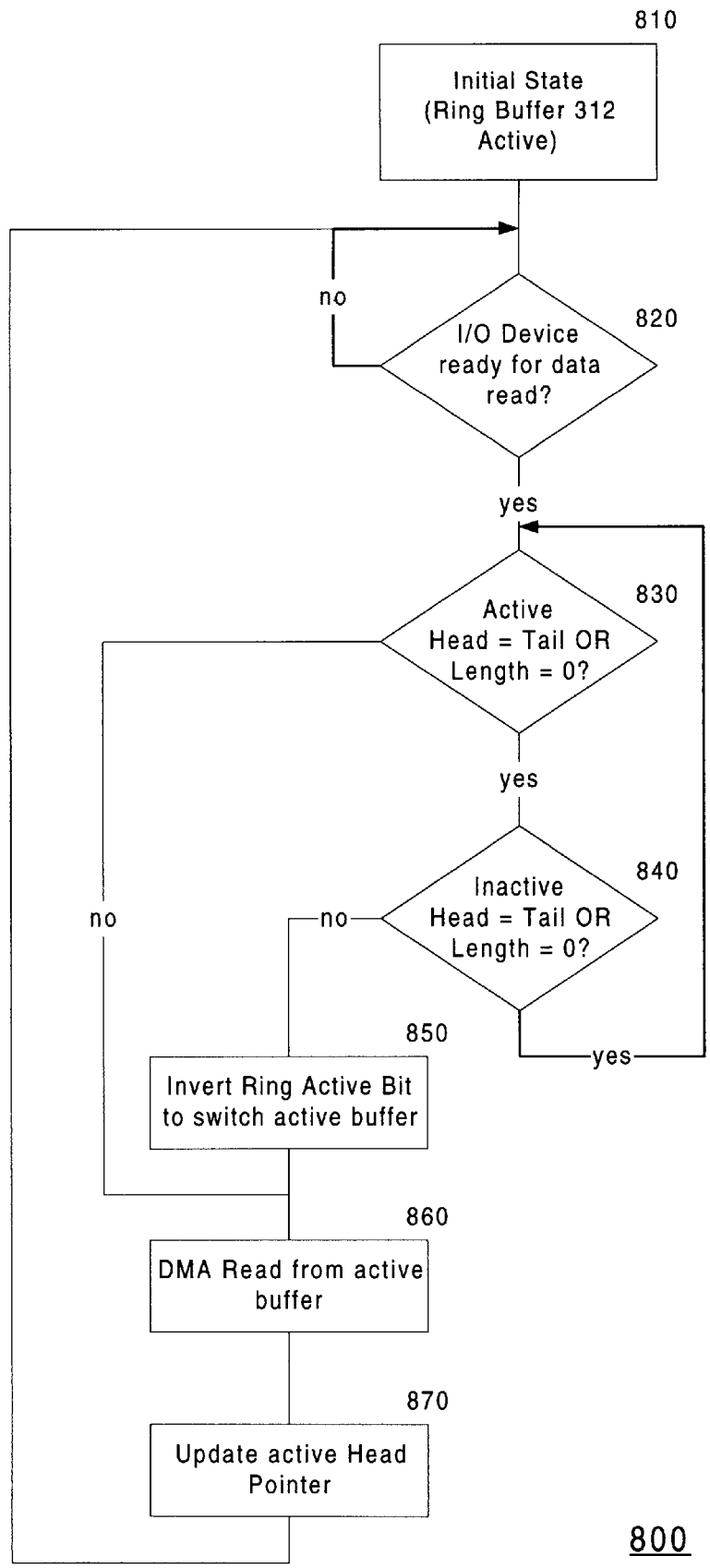
FIG. 5 is a flow chart of steps of a method for reading data from the ring buffers by the graphics device and for updating of the sets of registers by the graphics device.

The flow diagrams in FIGS. 5 and 6 give the detailed method of operation of the sets of registers 720 and 730 and buffers 312, 412, and 212 for the dynamic communication of data from the processor 300 to the graphics device 700 via buffers at different locations in the memory hierarchy. Data reads by the graphics device 700, as shown in FIG. 5, and data writes by the processor 300, as shown in FIG. 6, function separately. Data reads are described first.

Operation—Graphics Device Data Reads

The flow diagram 800 in FIG. 5 depicts the steps involved in data reads by the graphics device 700. In initial Step 810, the ring active bit of selection register 710 is set to "0" and buffer 312 is described by the active set of registers 720. Operation of the apparatus then enters a repeating portion of the flow diagram, Steps 820 to 870. Step 820 determines when the graphics device 700 is ready to read data. When ready, the graphics device 700 determines from which buffer to read using a DMA in Steps 830 to 850. Step 830 determines when data are present in the active buffer. If data are present in the active buffer, the operation proceeds to step 860. If the active buffer is empty, i.e. the associated head and tail pointer are equal or the length is 0, the operation proceeds to step 840 where to determine if there are data present in the inactive buffer. If the inactive buffer is also empty, then the method returns to step 830. If there are data in the inactive buffer, then the graphics device 700 inverts the ring active bit of the selection register 710 in step 850. The active buffer for data reads has been switched and the apparatus proceeds to step 860. In step 860, the graphics device 700 performs a DMA read from the active buffer, initially buffer 312, and in step 870 the graphics device 700 updates the head pointer in the active set of registers, initially head pointer 726. Finally, the method returns to step 820. The above method allows the use of two or more buffers by permitting the graphics device 700 to dynamically switch the buffer from which the graphics device 700 reads. As will be seen, the processor 300 determines which buffers, either 312, 412, or 212, that the set of registers 720 and 730 refer to at any given time. In this manner, the graphics device 700 can read in turn from buffers 312, 412, and 212 by always reading data from the active buffer.

Operation—Processor Data Writes

Figure 6A:
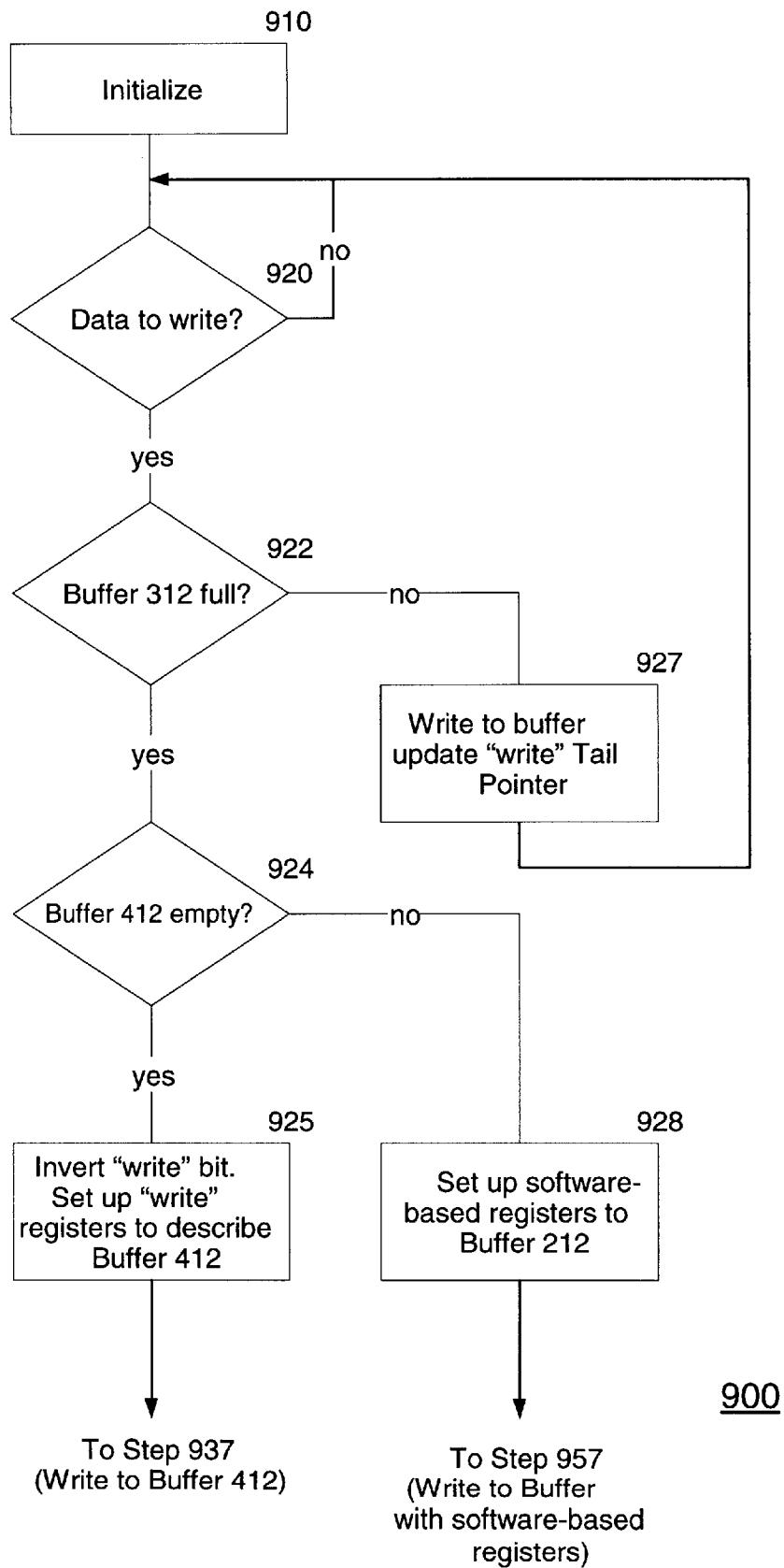
FIGS. 6a–6d are a flow chart of steps for writing data to the ring buffers by the processor and for updating of the sets of registers by the processor.
Figure 6B:
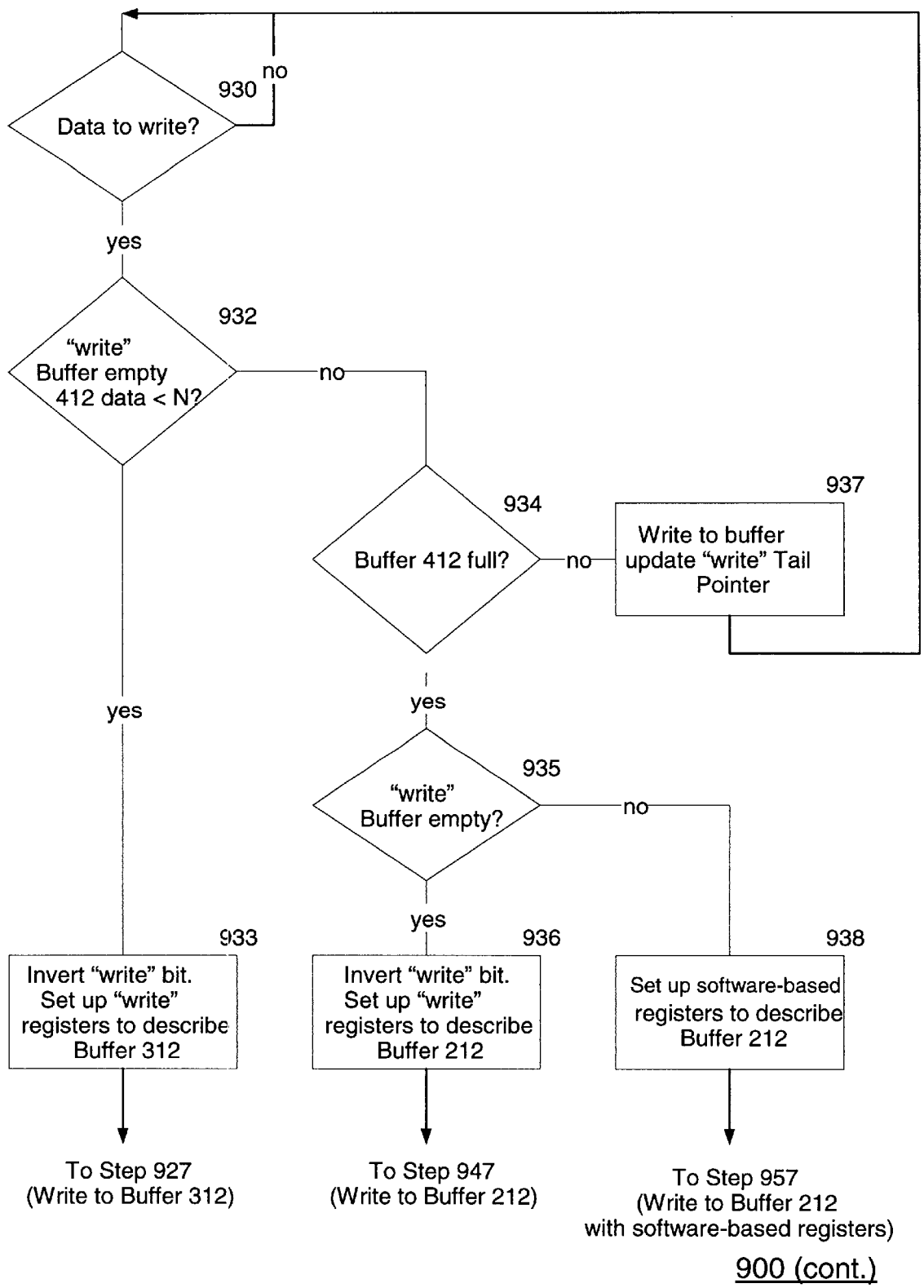
Figure 6C:
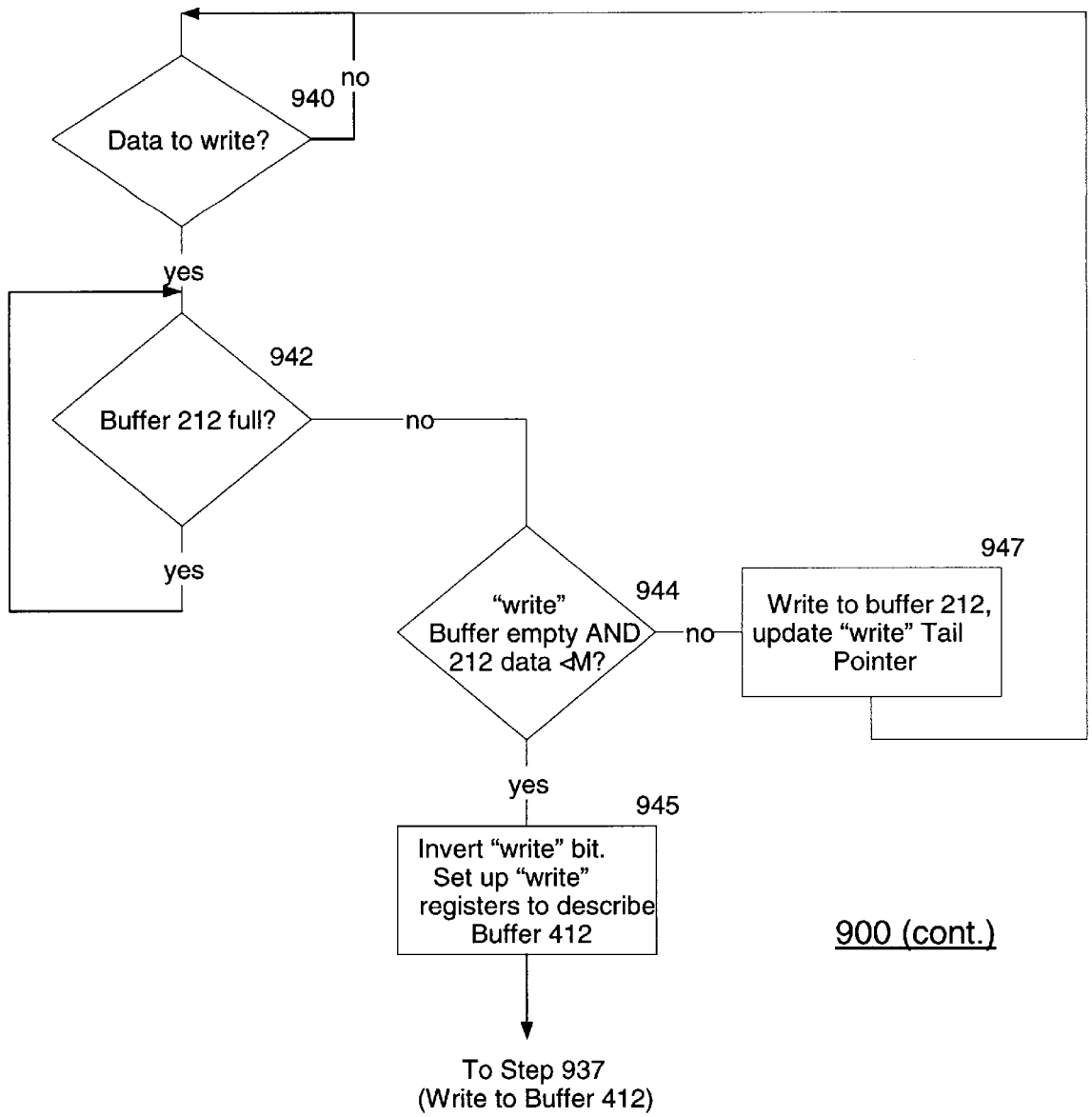
Figure 6D:
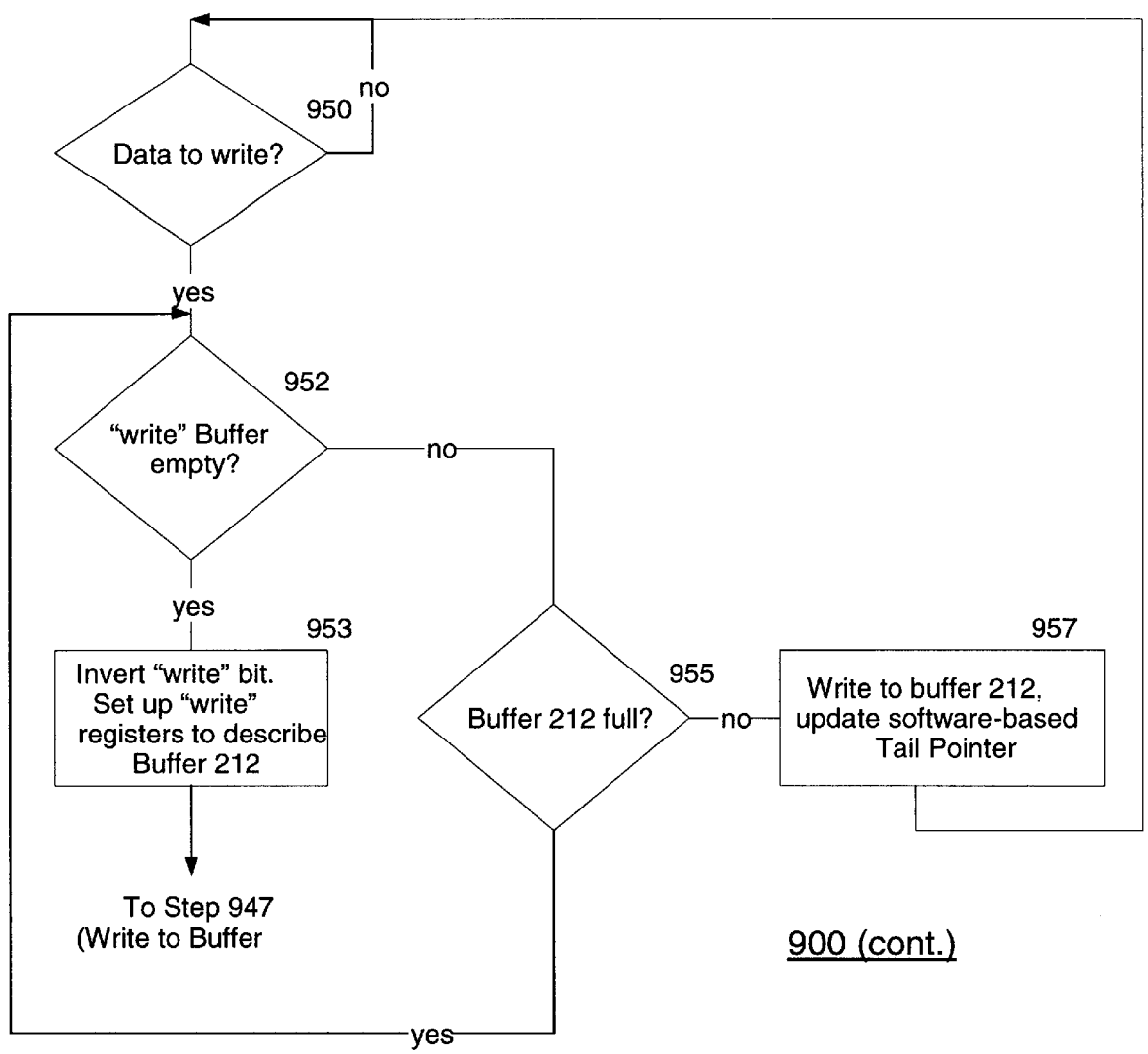

The flow diagram 900, FIGS. 6a through 6d, depicts the steps of a method for writing data by the processor 300. The one buffer 312, 412, or 212 presently used for writes is referred to as the "write" buffer. This will distinguish the present write buffer 312, 412, or 212, i.e. the "write" buffer, from the present read buffer 312, 412, or 212, i.e. the "active" buffer. FIG. 6a shows the operation of the apparatus of the invention when the processor 300 is trying to write to buffer 312. FIG. 6b shows the operation when the processor 300 is trying to write to buffer 412. FIG. 6c shows the operation when the processor 300 is trying to write to buffer 212, while updating one of the hardware tail pointers 728 or 738. FIG. 6d shows the operation when the processor 300 is trying to write to buffer 212, while updating the software-based tail pointer 328.

In a preferred embodiment of the invention, the buffers 212, 312, and 412 can change their association with the sets of registers 720 and 730 via software control. For example, through software control, the association of the set of registers 720 with the buffer 312 can be switched to an association of the set of registers 720 with the buffer 412. In other words, writes to a write buffer 312 can be tracked with the set of registers 720 or the set of registers 730. The set of registers 720 or 730 that is used to track writes is therefore called the "write" set of registers. The association must be tracked so that, as writes are made to the write buffer 312, 412, or 212, updates can be made to the write set of registers 720 or 730. To track this association, software has a "write" bit (not shown), analogous to the structural ring active bit of the selection register 710, which tells software which set of registers 720 or 730 to access during data writes. When the write bit is "0", software references to the ring base pointer, ring length, head pointer and tail pointer mean those in the set of registers 720, i.e. the set of registers 720 are the write set of registers. When the write bit is "1", software references are directed to the set of registers 730, i.e. the set of registers 730 are the write set of registers. Note that the write bit does not directly identify the present buffer 312, 412, or 212 for writes. The write bit just identifies the set of registers 720 or 730 presently used for which ever buffer 312, 412, or 212 is presently the write buffer.

In the initial state Step 910, all buffers are empty. Software sets the write bit to 0, and initializes the write set of registers, in this case the set of registers 720, to describe ring buffer 312. The initialization method of Step 910 in detail is as follows:

1. Write a 0 to ring buffer length 724.
2. Write the starting address of ring buffer 312 to ring base pointer 722.
3. If the head pointer 726 and the tail pointer 728 are addresses, write the same physical address to the head pointer 726 and the tail pointer 728; if indices, write 0 into the head pointer 726 and the tail pointer 728.
4. Write the actual length of the ring buffer 312 to the ring buffer length 724.

Step 920 determines whether the processor 300 has data to write. If not, then step 920 repeats until the processor 300 has data to write. If data are available for writes at step 920, then step 922 determines whether buffer 312 has space available for data writes by comparing the write head pointer, presently head pointer 726, with the write tail pointer, presently tail pointer 728. If space is available, i.e. buffer 312 is not full, then step 927 occurs next. In step 927, the processor 300 writes data to buffer 312 and subsequently optionally updates the write tail pointer, presently tail-pointer 728. Operation then returns to step 920.

If buffer 312 instead is found to be full at step 922, then step 924 next occurs. This step determines whether buffer 412 is empty by comparing the non-write head and tail pointers. If buffer 412 is not empty at step 924, then the graphics device 700 is still executing commands from buffer 412, and the processor 300 has completely filled buffer 312. Thus both set of registers 720 and 730 are in use. In order to avoid stalling the processor 300, the method proceeds to step 928, where the software-based set of registers 320 is set up to describe buffer 212, after which the method proceeds to step 957.

Figure 3B:
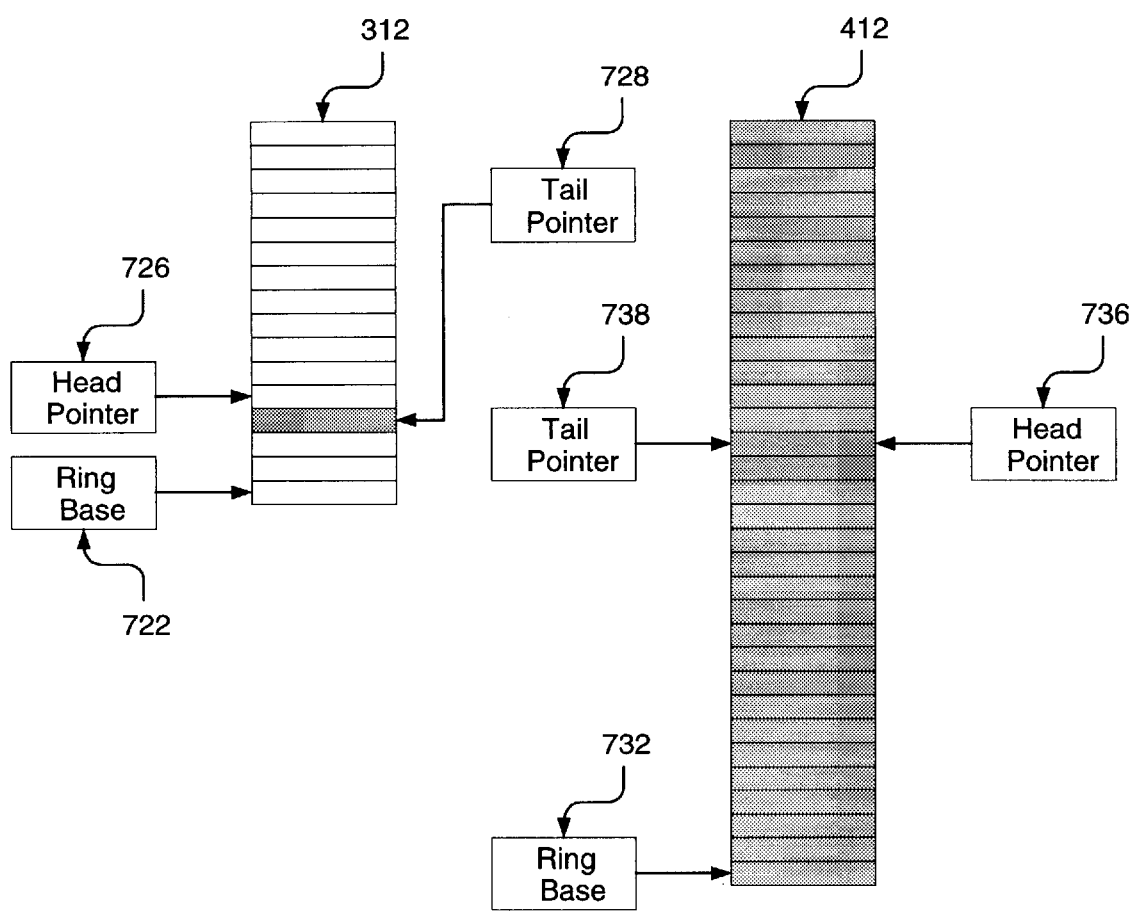

If step 924 confirms the presence of an empty buffer 412, then the situation depicted in FIG. 3b exists, and step 925 next occurs. Step 925 inverts the write bit, so that software references to the set of registers will access the currently unused set of registers 720 or 730, and the write set of registers is initialized to describe buffer 412. The method proceeds to step 937. In this manner, the available buffer, in this case the buffer 412, at a lowest possible level of the memory is selected as the write buffer.

FIG. 6b shows the method when the processor 300 is trying to write to the buffer 412. This is the most complicated portion of the method, because the data written may actually be stored into the buffer 412, then into the smaller buffer 312, or into the larger buffer 212. Step 930 tests whether the processor 300 has data to write, and step 930 repeats until the processor 300 does have data to write. The method then proceeds to step 932, which determines:

1) whether the set of registers 720 or 730 not in use by software, that is, the set of registers designated by the inverse of the write bit, are empty and thus not in use by hardware for data reads; and
2) if buffer 412 has fewer memory addresses with stored data than a predetermined value "N".

The value N is always less than the number of memory addresses of the buffer 312, i.e. the size of the buffer 312. N is fixed at a predetermined value to provide best performance for a particular application of the apparatus. A typical value of N for a graphics device 700 might be about 50–75% of the size of the buffer 312. If step 932 determines that the non-write set of registers is empty and that buffer 412 contains fewer memory addresses with stored data than the predetermined value N, then the situation depicted in FIG. 3e exists, and the method continues at step 933. Step 933 inverts the write bit, sets up the write set of registers to describe the buffer 312, then proceeds to step 927. If not, operation proceeds from step 932 to step 934, which tests whether the buffer 412 is full by comparing the write head pointer to the write tail pointer. If the buffer 412 is found not to be full at step 934, then step 937 occurs. Step 937 writes the data to the buffer 412, optionally updates the write tail pointer, and returns to step 930. If the buffer 412 is found to be full at step 934, then step 935 occurs. Step 935 determines whether the set of registers 720 or 730 not in use by software is empty. If so, then step 936 inverts the write bit, and sets up the write set of registers 720 or 730 to describe buffer 212, then proceeds to step 947. If step 935 determines that the non-write set of registers is still in use by hardware, then operation proceeds to step 938, which is identical to step 928. In this manner, the available buffer at the lowest possible level of the memory is selected as the write buffer.

FIG. 6c shows operation when the processor 300 is trying to write to buffer 212, and the write set of registers describe buffer 212. Step 940 tests if there are data to write, and repeats until there are data, at which point operation proceeds to step 942. Step 942 determines whether the buffer 212 is full, and repeats until the buffer 212 is not full. When buffer 212 is not full, operation proceeds to step 944. Similarly as in step 932, step 944 tests whether the set of registers 720 or 730 not in use by software are also unused by the graphics device 700, and whether the buffer 212 has fewer memory addresses with stored data than a predetermined value "M"; if so, operation proceeds to step 945, otherwise to step 947. The value M is always less than the length, i.e. the size, of buffer 412. The value M is determined to provide best performance for a particular application of the apparatus. In practice, optimal choices for M can be determined experimentally. Step 945 is identical to step 925. Otherwise, the method proceeds to step 947 where writes occur to the buffer 212 and the write tail pointer is optionally updated, and the method then continues with step 940. In this manner, the available buffer at the lowest possible level of the memory is selected as the write buffer, in this case the buffer 212.

FIG. 6d shows operation when the processor 300 is trying to write to buffer 212, and the sets of registers 720 and 730 are already devoted to describing the buffers 312 and 412. In this case, the processor 300 cannot update either of the tail pointers 728 or 738. Step 950 tests whether there are data to write, and repeats until there are data, at which point operation proceeds to step 952. Step 952 tests for emptiness the set of registers 720 or 730 least recently used by software. When empty, software can set up the unused set of registers 720 or 730 to notify the graphics device 300 about buffer 212, and operation proceeds to step 953. Step 953 inverts the write bit, and sets up the write set of registers 720 or 730 to describe buffer 212. Note, since the buffer 212 already contains data, the software-based head pointer 326 and software-based tail pointer 328 values are written to head pointer 726 and tail pointer 728 or to head pointer 736 and tail pointer 738. Otherwise, operation proceeds to step 955, which tests if buffer 212 is full. If so, then operation returns to step 952. Otherwise, operation proceeds to step 957, which writes the data to the buffer 212 and updates the software-based tail pointer 328, but does not update either the tail pointer 728 or the tail pointer 738. The method then returns to step 950. Again, in the above method, the available buffer at the lowest possible level of the memory is selected as the write buffer.

In a preferred embodiment of the invention, tests for the number of memory addresses available for data writes in a buffer are made occasionally, rather than before each write of data to a buffer memory address. Similarly, tail pointers should be periodically updated rather than after data is written to each buffer memory address.

Alternatively, only one set of hardware registers is required. And, the single set of hardware registers need only include a single head register. In the latter alternative, a bit of data associated with the data stored at each buffer address can indicate whether or not the data at that address is to be read. Storing a switch command in the buffer can activate a switch to a new read buffer.

Examples of Operation of the Registers and Buffers

FIGS. 3a through 3l illustrate the operation of the buffers 312, 412, and 212 and the sets of registers 720 and 730 and the selection register 710. Commencing with an active bit 710 set to 0, the graphics device 700 reads data from active buffer 312. In FIG. 3a, eight locations in buffer 312 store data. As the processor 300 writes data to the buffer 312, the tail pointer 728 is updated so that the tail pointer 728 continues to point to the next buffer address available for storing data. If the graphics device 700 is busy performing other functions, then the graphics device will temporarily cease to read data from the buffer 312. Eventually, as depicted in FIG. 3b, the buffer 312 fills with data written by the processor 300. At this time, the buffer 312 has one empty address. This address cannot be filled, for then the head and tail pointers 726 and 728 would be identical and the buffer would appear to be empty rather than full.

Figure 3C:
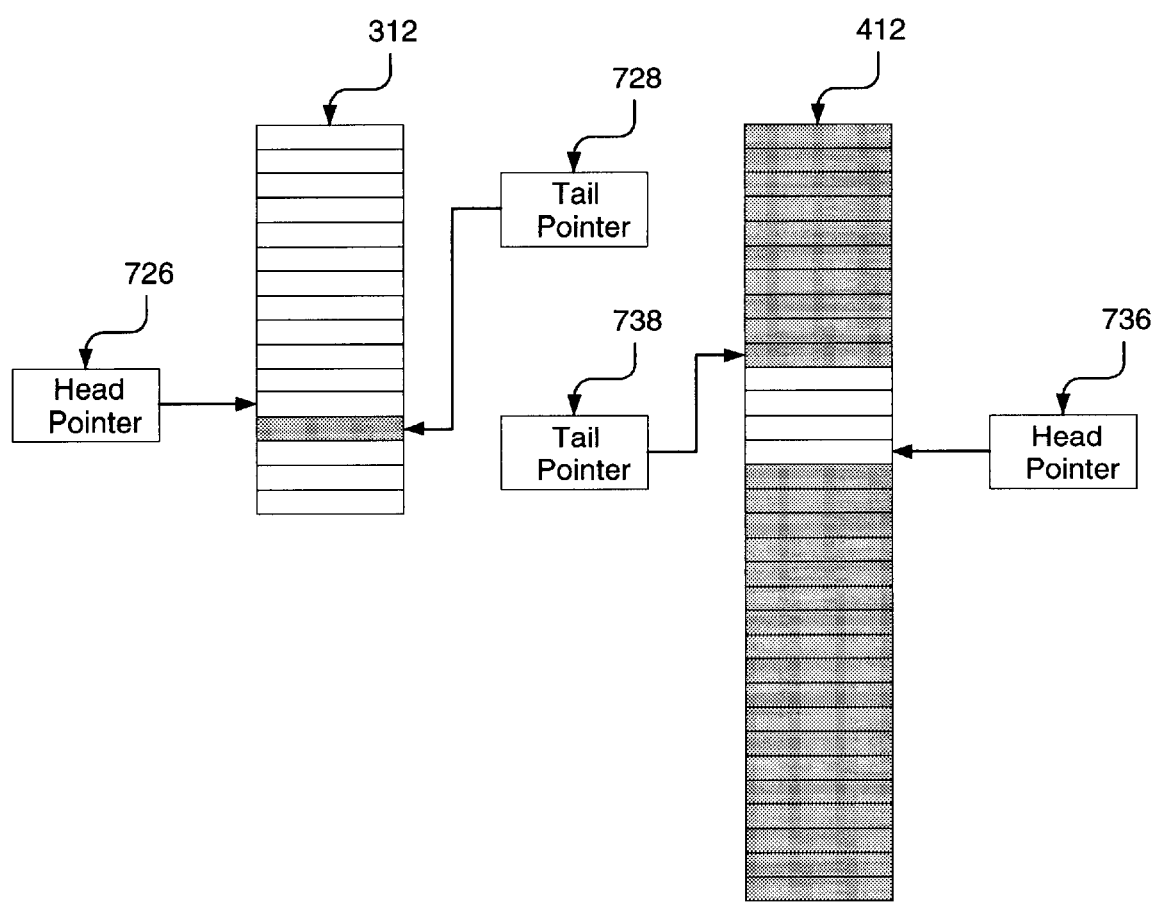

As depicted in FIG. 3c, a stall or context switch by the processor 300 is prevented by switching to an alternate, typically much larger, buffer. The processor 300 has written four data entries to the ring buffer 412 and updated the tail pointer 738 to indicate the next available buffer address. Note that while the write bit is now 1, so that the processor 300 updates the tail pointer 738, the ring active bit of the selection register 710 is still 0, so that the graphics device 700 still reads from the buffer 312 and updates the head pointer 726; the graphics device 700 must read all of the data from the buffer 312 before reading any data from the buffer 412. In this case, the graphics device 700 continues to process data. The graphics device 700 has yet to read another data item from the buffer 312, i.e. the header pointer 726 has yet to move.

Figure 3D:
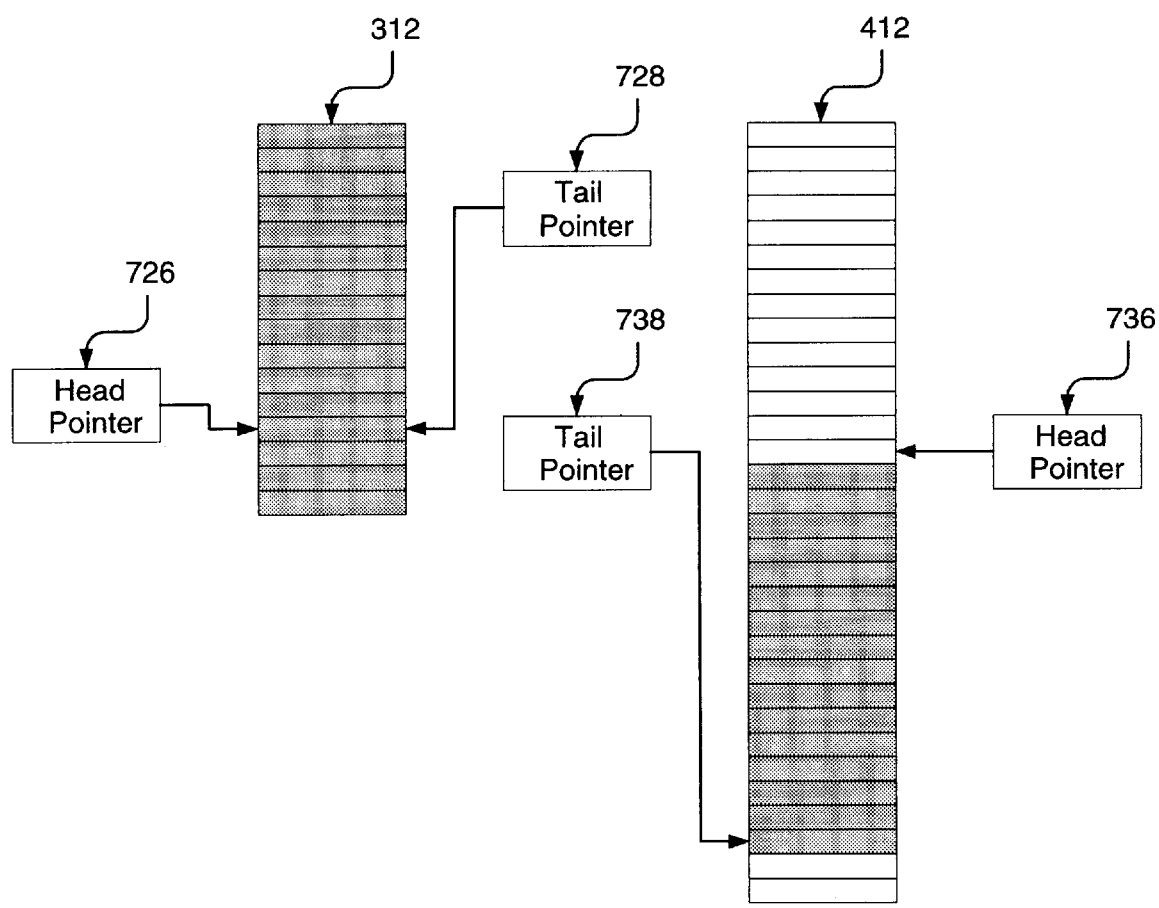

As depicted in FIG. 3d, the processor 300 has written more data to the buffer 412. The graphics device 700 meanwhile has completed its other processing function and also has read data from the active buffer 312, emptying the buffer 312 of all data. The graphics device notes an empty buffer 312 due to the equivalence of the associated head and tail pointers 726 and 728. The graphics device 700 examines the ring buffer 412 for data by comparison of the head and the tail pointers 736 and 738, and by determining if the buffer length 734 is non-zero. The graphics device inverts the ring active bit of the selection register 710 to value "1" upon finding nonequivalent addresses in the head pointer 736 and the tail pointer 738, and a non-zero length in the register 724. Thus, the set of registers 730 becomes active. The graphics device 700 commences reading data from the buffer 412, starting at the address given by the head pointer 736.

Figure 3E:
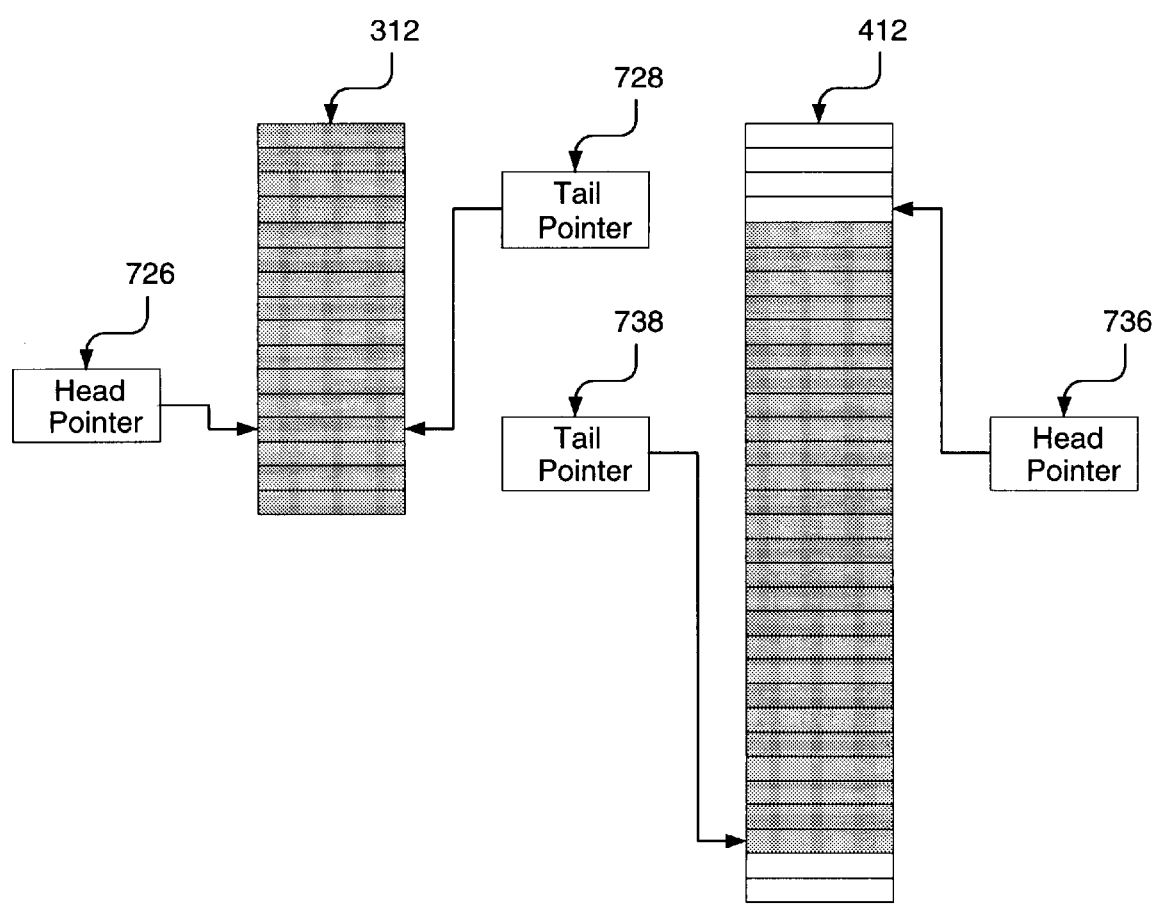
Figure 3F:
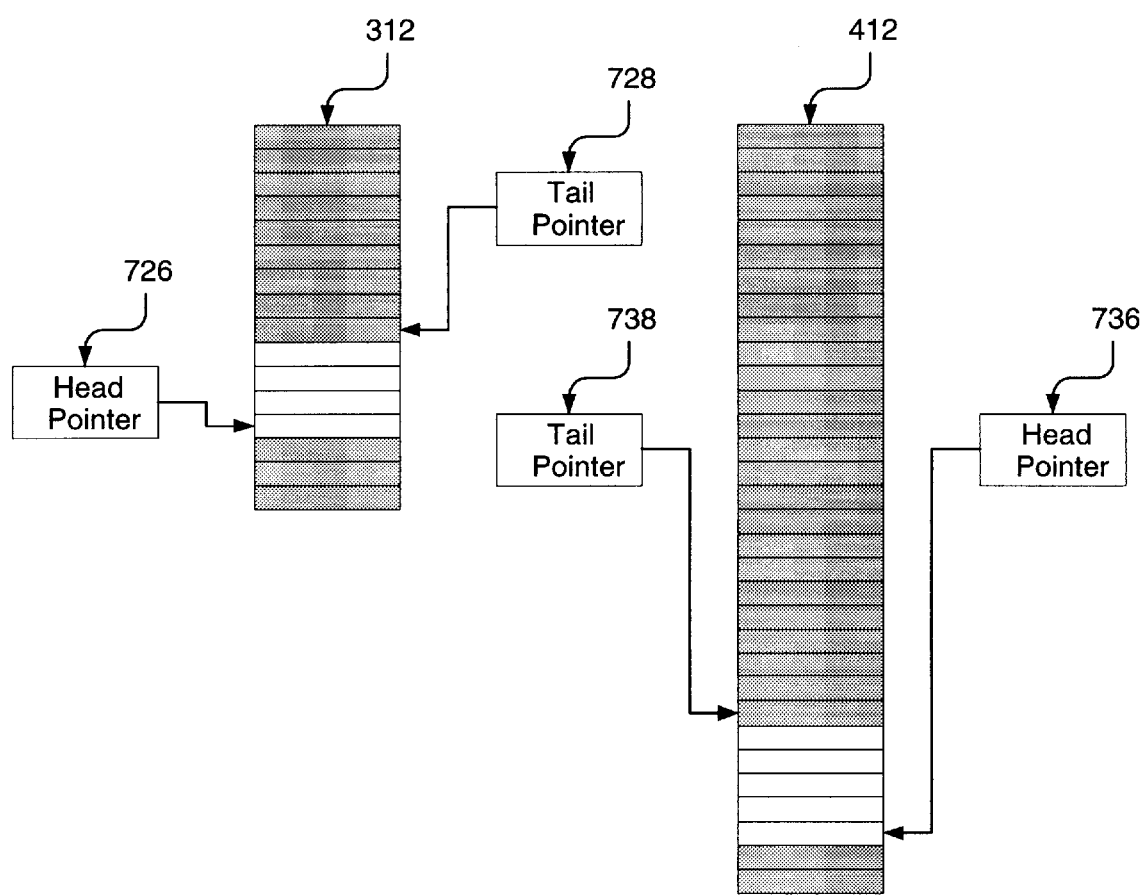
Figure 3G:
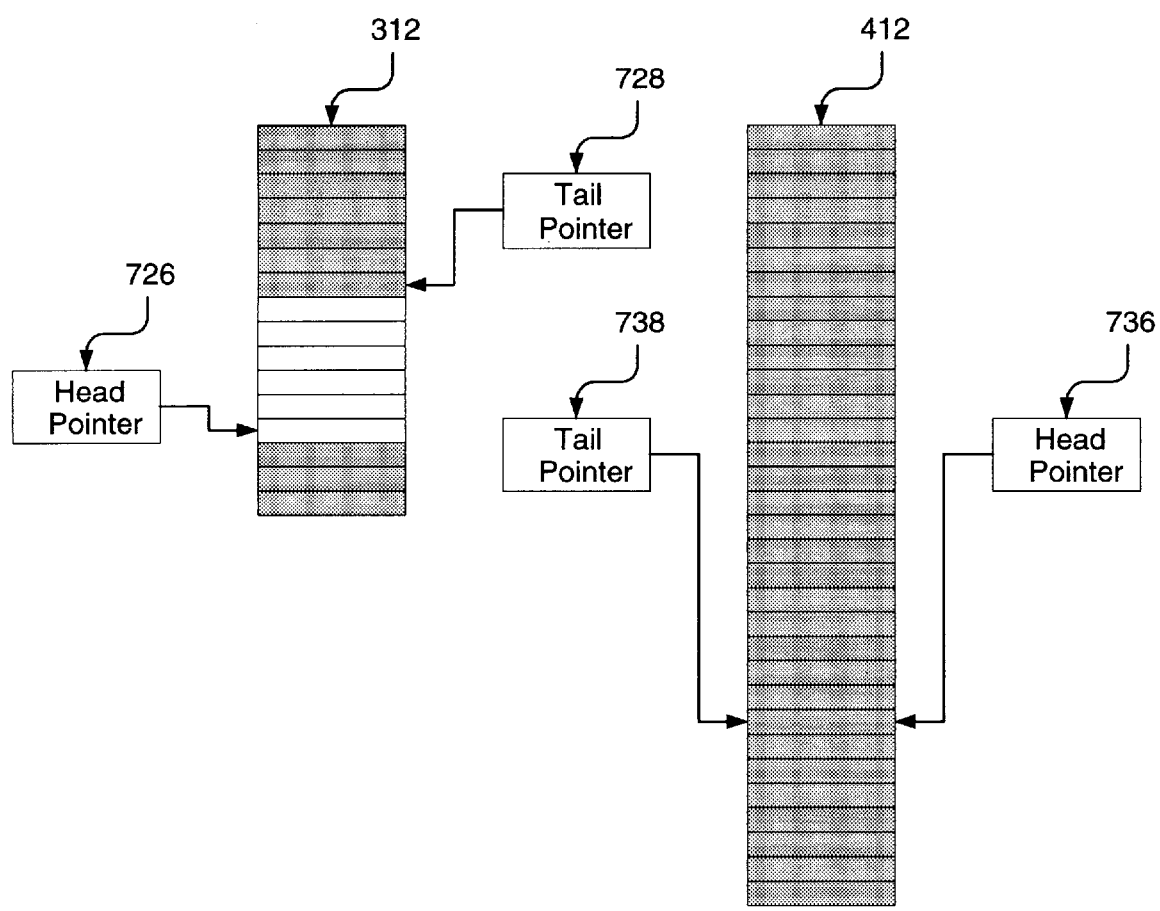

FIGS. 3e, 3f, and 3g depict how to switch to a smaller, though more efficient buffer. In FIG. 3e, the graphics device 700 has read a large quantity of data from the buffer 412 while the processor 300 has written no additional data to the buffer 412. The processor 300 notes that the buffer 412 stores a small quantity of data relative to the possible buffer size of the more efficient buffer 312. An appropriate ratio, about 50–75% as described above, of the remaining entries in the buffer 412 to the buffer size in the buffer 312 determines that a switch of should be made for writes to the buffer 312. The ratio is chosen to ensure that little chance arises that the processor 300 will quickly fill buffer 312 with data before the graphics device 700 begins reading data from buffer 312. In FIG. 3f, the processor begins writing new data to the buffer 312 and consistently updates the tail pointer 728. Meanwhile, the graphics device 700 continues reading data from the active buffer 412. As depicted in FIG. 3g, after data reads by the graphics device 700, the graphics device 700 notes an empty buffer 412, again by comparing its associated the head and the tail pointers 736 and 738. The graphics device determines that the buffer 312 stores data by comparing the head pointer 726 and the tail pointer 728, and by noting whether the buffer length 724 is non-zero. The graphics devices again inverts the ring active bit of selection register 710 and the graphics device 700 begins to read data from the smaller, more efficient buffer 312.

Use of a Third Buffer

If the write bit is not equal to the active bit 710, that is, the processor 300 is writing to one buffer while the graphics device 700 is reading data from a different buffer, then a more complicated situation can arise. The present write buffer receiving writescan become full before the graphics device 700 finishes reading all data in the active buffer. Use of a third buffer can permit data writes by the processor 300 to continue.

Figure 3H:
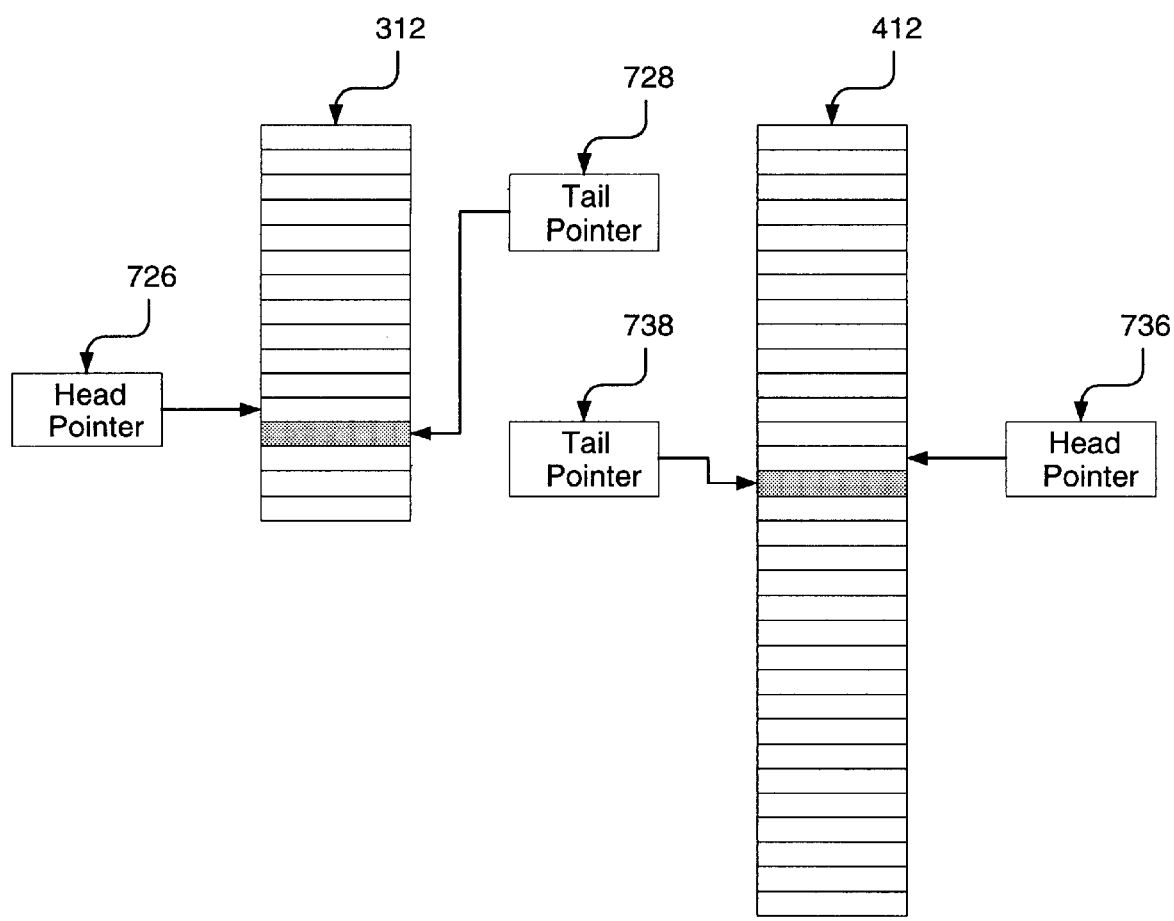
Figure 3I:
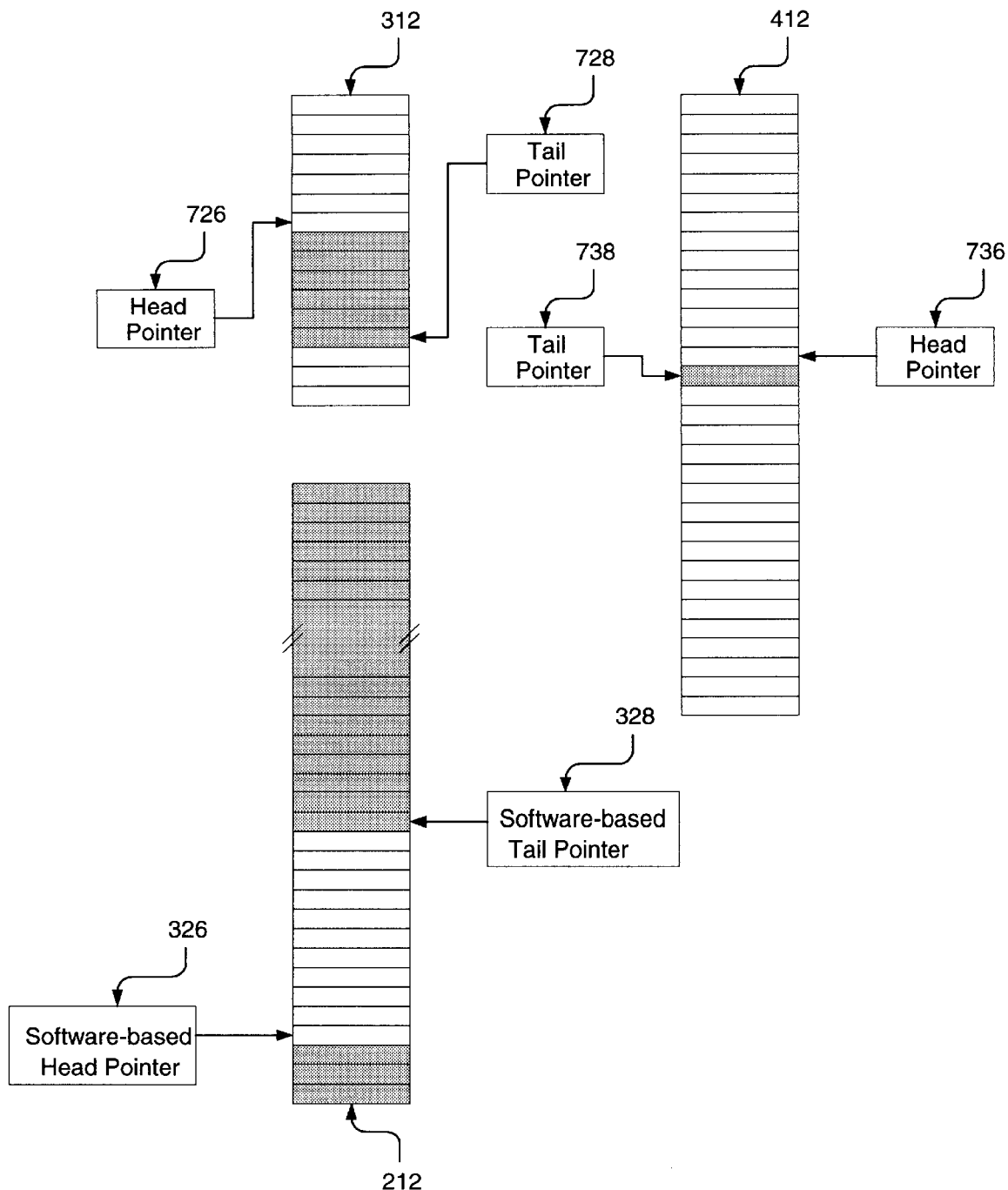

First, consider an active buffer 312. FIG. 3h depicts a scenario in which the buffer 412 fills with data from the processor 300. Meanwhile, the graphics device 700 experiences a processing induced pause before the graphics device 700 resumes reading data from the full active buffer 312. While FIG. 3h depicts the full buffer 312, comments here generally also apply to a partially filled buffer 312. Various options are possible. For a very large buffer 412, one option is to permit the processor to switch contexts while awaiting the graphics device 700 to read a significant portion of this data. Alternatively, as depicted in FIG. 3i, if the buffer 412 resides at some intermediate location in the memory hierarchy, such as in off-chip cache 400, then best performance can be obtained by writing data to a third, larger, ring buffer 212.

The method under discussion tracks the location of data and assures that the graphics device 700 reads data from the three buffers 312, 412, and 212 in a sequence in which the data were written by the processor 300. Note that, in the present scenario, data must be fully read from, first, the buffer 312, next, the buffer 412, and, lastly, the third buffer 212, before using just the two original buffers 312 and 412. In FIG. 3i, the buffer 412 has become full while the graphics device 700 continues reading data from the buffer 312. The processor 300 writes data to the buffer 212 while awaiting the emptying of the buffer 312. The processor 300 periodically checks the pointers in the set of registers 720 to determine the availability of the set of registers 720 by the emptying of the buffer 312.

With use of the third buffer, treatment of the head pointer 726 and the tail pointer 728 for the buffer 312 changes. The head pointer 726 and the tail pointer 728 indirectly take part in tracking the location of data in both the buffer 312 and the temporary buffer 212. When the processor 300 fills buffer 412 and begins writes to buffer 312, the processor 300 updates tail pointer 728 to track the location of the most recently entered data and next available data location. With writes directed to the buffer 212, the set of registers 720 continues to refer to the buffer 312 as long as data remains in the buffer 312. As described above, the processor 300 uses the software-based set of registers 320 with the software-based tail pointer 328 to point to the next available memory location in the buffer 212. In this manner, writes to the address given by the software-based tail pointer 328 are redirected to the buffer 212. FIG. 3i depicts writes to the buffer 212 without updates to the tail pointer 728. The graphics device 700 continues to read the remaining data in the buffer 312 before proceeding to read the data in the full buffer 412.

Figure 3J:
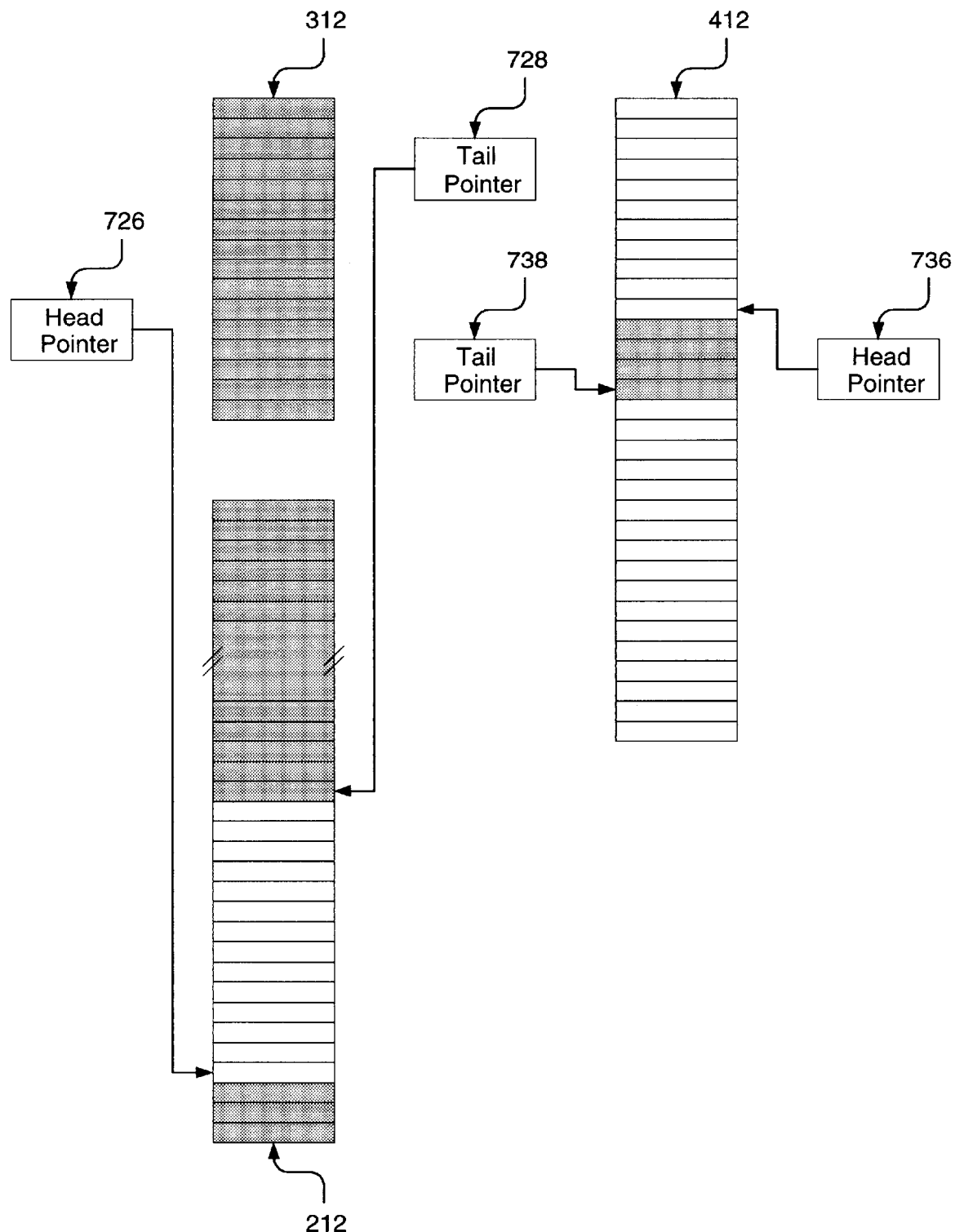

With the eventual emptying of the buffer 312, the buffer 412, described by set of registers 730, becomes the active buffer when the graphics device 700 changes the ring active bit of selection register 710 to a value of 1. As depicted in FIG. 3j, the processor 300 notes the newly active buffer 412 and sets the set of registers 720 to the correct values for the buffer 212. This permits use of the set of registers 720 for control of data reads by the graphics device 700 from the buffer 212, after the graphics device 700 completes reading data from the buffer 412. In this manner, the graphics device 700 will correctly treat the buffer 212 as the active buffer after completion of data reads from the buffer 412. After the graphics device 700 reads all data in the buffer 212, the set of registers 720 can again refer to the buffer 312.

Figure 3K:
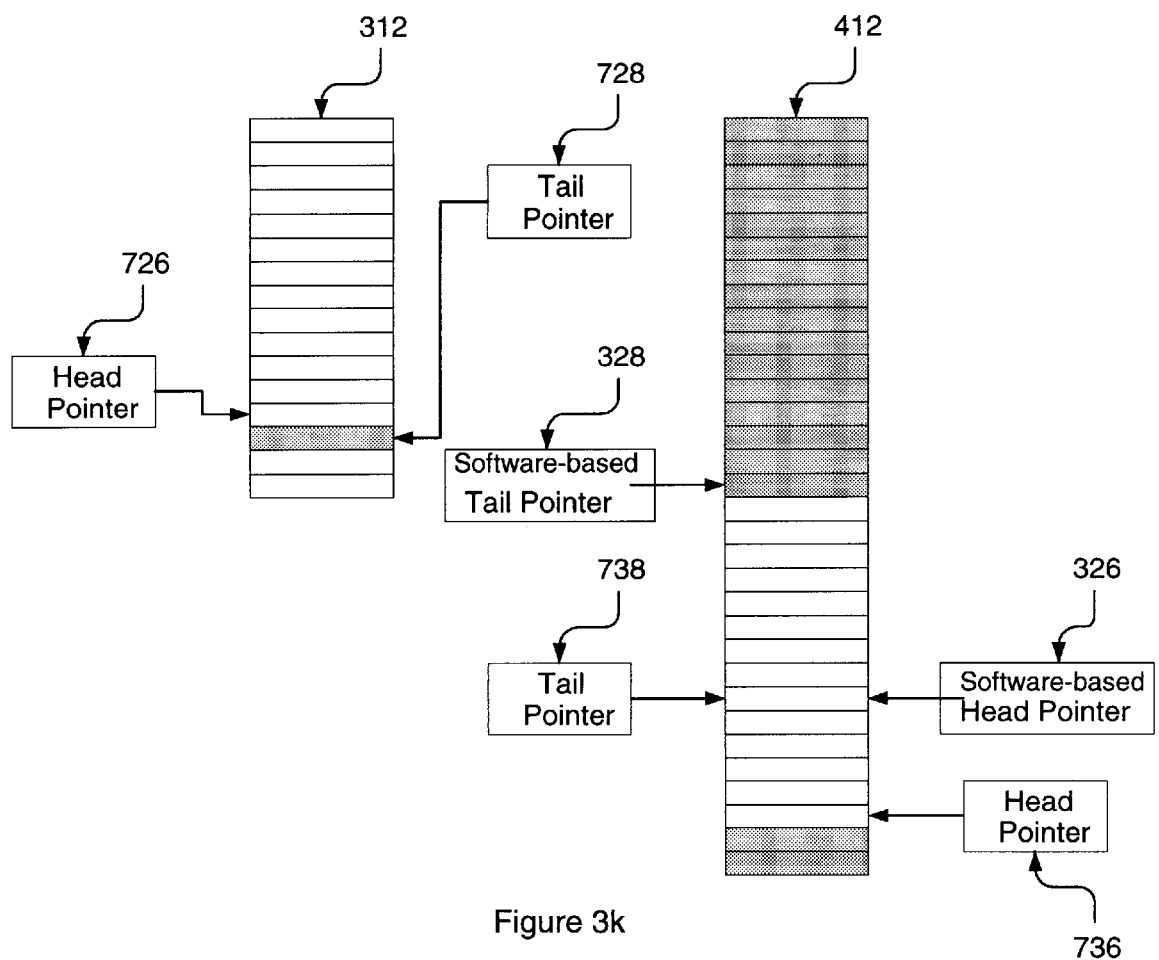
Figure 3I:
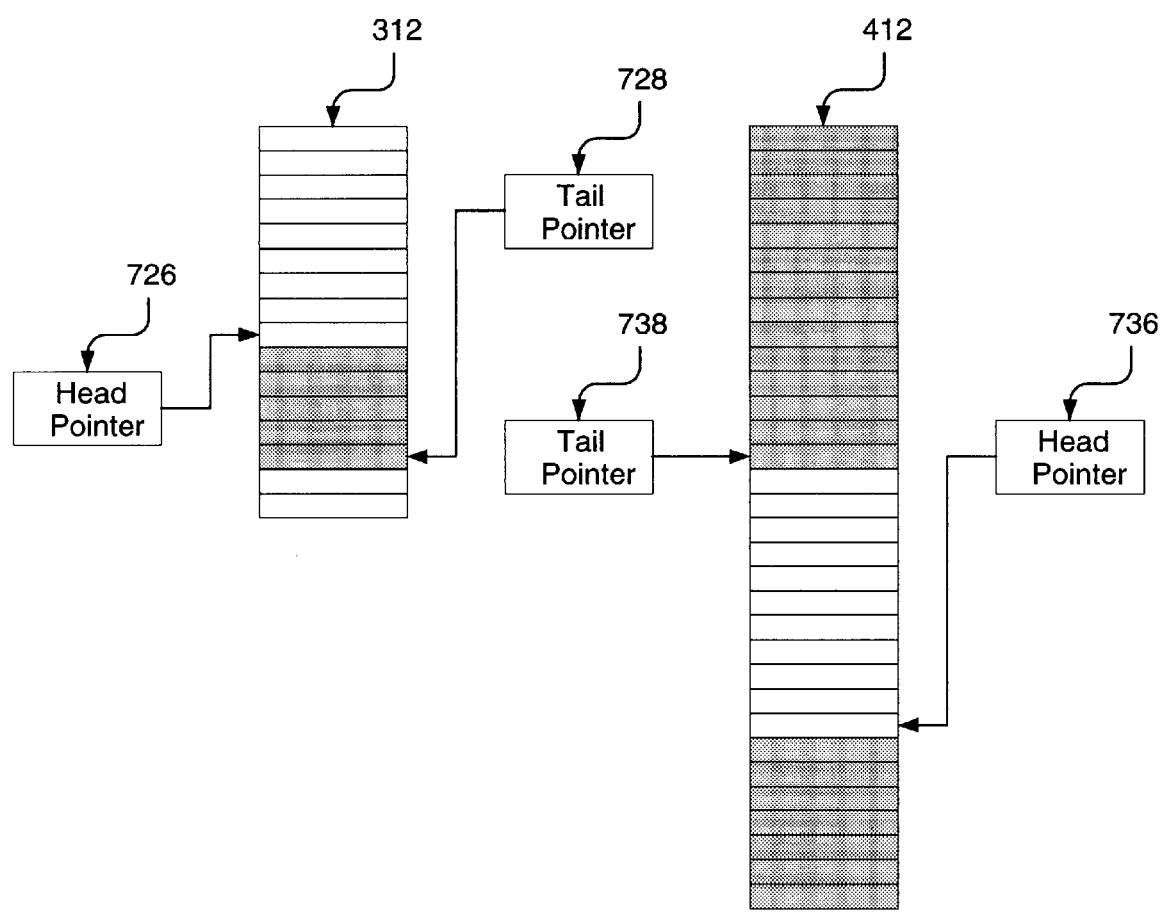

In another scenario, writes by the processor 300 can fill the buffer 312 before the active buffer 412 is emptied of data by the graphics device 700. The processor 300 may then write data to the third, larger buffer, as discussed above and described in steps 900. Alternatively, given the relatively large size of the buffer 412, writes can occur to the available space in the buffer 412. The available space in the buffer 412 resides between the addresses given by the tail pointer 728 and the head pointer 726. In either option, tracking of this newly written set of data occurs exactly as described above. FIG. 3k depicts the writing of data to unused space in the buffer 412, beginning and proceeding from the location given by the tail pointer 728. The set of registers 730 will be updated with the software-based head pointer 326 and the software-based tail pointer 328 by the processor 300 after the graphics device 700 completes its read of the preexisting data in the buffer 412. FIG. 3l depicts the updated head pointer 736 and the tail pointer 738 after the graphics device 700 has completed reading the preexisting data in the buffer 412 and has moved on to read data from the buffer 312.

The above embodiments of the invention are merely illustrative. Various modifications and changes may be made by those skilled in the art which will embody the principles of the invention and fall within the scope thereof. For example, these modifications can include variations in the number, size, and location of buffers and sets of registers.

I claim:

1. An apparatus for buffering data transmitted by a processor and received by an I/O device via a memory and buses, the memory arranged at a plurality of levels, a lower level of the memory operating faster than a higher level of the memory, comprising:

a plurality of buffers allocated at different levels of the memory, the buffers being coupled to the processor and the I/O device such that the processor and the I/O device can simultaneously access the same buffer;

means for selecting an available buffer of the plurality of buffers at a lowest possible level of the memory as a write buffer, the write buffer storing data transmitted by the processor; and means for selecting a buffer of the plurality of buffers as a read buffer, the read buffer storing data to be received by the I/O device, wherein at least a portion of the data transmitted by the processor to the write buffer and at least a portion of the data received by the I/O device from the read buffer are simultaneously directed at different buffers located at different levels in the memory.

2. The apparatus as in claim 1 further including a first level of the memory arranged on an integrated circuit with the processor, a second level of the memory arranged in an off-chip cache, and a third level of the memory arranged in a dynamic random access memory.

3. The apparatus as in claim 1 wherein the means for selecting selects read buffers in an identical order as write buffers.

4. The apparatus of claim 3 further including means for storing control values, the control values indicating the order for selecting the read buffers.

5. The apparatus of claim 4 wherein the means for storing control values includes registers located in the I/O device.

6. The apparatus of claim 4 wherein the means for storing control values includes software-based registers stored in the dynamic random access memory.

7. The apparatus of claim 3 wherein the plurality of buffers are ring buffers and wherein the control values include a head pointer, a tail pointer, a length, and a base address associated with each of the plurality of buffers.

8. The apparatus as in claim 7 wherein the processor includes the means for selecting the write buffer and the means for selecting the write buffer includes means for comparing the head pointers and the tail pointers.

9. The apparatus of claim 7 wherein the I/O device includes the means for selecting the read buffer and the means for selecting the read buffer includes means for comparing the head pointers and the tail pointers.

10. The apparatus of claim 9 wherein the I/O device includes a switch register indicating the selected read buffer.

11. The apparatus of claim 1 wherein the means for selecting the read buffer includes means for writing a switch command to the write buffer.

12. A method for buffering data transmitted by a processor and received by an I/O device via a memory and buses, the memory arranged at a plurality of levels, a lower level of the memory operating faster than a higher level of the memory, comprising:

allocating a plurality of buffers at different levels of the memory, the buffers being coupled to the processor and the I/O device such that the processor and the I/O device can simultaneously access the same buffer;

selecting an available buffer of the plurality of buffers at a lowest possible level of the memory as a write buffer, the write buffer storing data transmitted by the processor;

selecting a buffer as a read buffer, the read buffer storing data to be received by the I/O device; and simultaneously transmitting, by the processor, data to the write buffer and receiving, by the I/O device, data from the read buffer, the write buffer being located at a different level in the memory from the read buffer.

13. The method of claim 12 wherein the selected available buffer is the current write buffer, and the selecting the write buffer includes selecting a buffer at a next available higher level of memory when the current write buffer is full.

14. The method of claim 12 wherein the selecting the write buffer includes determining if the current write buffer has fewer memory addresses with stored data than a predetermined number of memory addresses and determining if a buffer at a next lower level of memory is empty.

15. The method of claim 12 further including storing control values associated with each buffer.

16. The method of claim 15 wherein the storing control values stores a head pointer associated with the write buffer, the head pointer stored in a hardware-based register.

17. The method of claim 16 wherein the storing control values includes storing control values as software variables.

18. The method of claim 15 wherein the storing control values stores a head pointer, a tail pointer, a length, and a base address associated with each buffer.

19. The method of claim 18 wherein the selecting the read buffer includes comparing the head pointer to the tail pointer for each associated buffer and wherein the selecting the write buffer includes comparing the head pointer to the tail pointer for each associated buffer.

20. The method of claim 19 wherein the selecting the read buffer further includes setting a selection register.

21. The method of claim 20 further including locating the selection register at the I/O device.

22. The method of claim 19 wherein the storing the head pointer, the tail pointer, the length, and the base address associated with a first buffer of the plurality of buffers in a first hardware-based set of registers and storing the head pointer, the tail pointer, the length, and the base address associated with a second buffer of the plurality of buffers in a second hardware-based set of registers.

23. The method of claim 22 wherein the storing includes storing the head pointer, the tail pointer, the length, and the base address associated with a third buffer of the plurality of buffers as software variables.

24. The method of claim 23 further including transferring the software variables to one of the hardware-based sets of registers to prepare for selection of the third buffer as the read buffer.

25. The method of claim 19 further including periodically updating the tail pointer associated with the write buffer after writes by the processor to the write buffer and periodically updating the head pointer associated with the read buffer after reads from the read buffer by the I/O device.

26. The method of claim 25 further including updating the tail pointer associated with the write buffer through PIO writes.

27. The method of claim 19 wherein the selecting the read buffer includes writing a switch command, by the processor, to the write buffer.

* * * * *